US012698040B2

(12) United States Patent
Sawa et al.

(10) Patent No.: US 12,698,040 B2
(45) Date of Patent: Aug. 4, 2026

(54) AUTOMOTIVE EXTERIOR COMPONENT

(71) Applicant: NIPPON STEEL CORPORATION, Tokyo (JP)

(72) Inventors: Yasunori Sawa, Tokyo (JP); Ryuichi Nishimura, Tokyo (JP); Koichi Hamada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 342 days.

(21) Appl. No.: 18/283,073

(22) PCT Filed: Jun. 6, 2022

(86) PCT No.: PCT/JP2022/022799
§ 371 (c)(1),
(2) Date: Sep. 20, 2023

(87) PCT Pub. No.: WO2022/255497
PCT Pub. Date: Dec. 8, 2022

(65) Prior Publication Data
US 2024/0166268 A1      May 23, 2024

(30) Foreign Application Priority Data

Jun. 4, 2021    (JP) ................................. 2021-094021
Oct. 28, 2021   (JP) ................................. 2021-176012

(51) Int. Cl.
*B62D 25/10*          (2006.01)
*B62D 25/12*          (2006.01)
(Continued)

(52) U.S. Cl.
CPC ............. *B62D 25/10* (2013.01); *B62D 25/12* (2013.01); *B62D 27/026* (2013.01);
(Continued)

(58) Field of Classification Search
CPC ........ B62D 25/10; B62D 25/06; B62D 25/12; B62D 29/007
(Continued)

(56) References Cited

U.S. PATENT DOCUMENTS 5,000,997 A * 3/1991 Ritchie .................... B05D 7/02
                                                                427/209
7,090,289 B2 * 8/2006 Koura ..................... B60R 21/34
                                                                296/193.11
(Continued)

FOREIGN PATENT DOCUMENTS

CN          108179823 A      6/2018
JP           4-4070 A      1/1992
(Continued)

*Primary Examiner* — Joseph D. Pape
(74) *Attorney, Agent, or Firm* — Birch, Stewart, Kolasch & Birch, LLP

(57)          ABSTRACT

An automobile hood 1 has a first-direction joint row 30 in which a plurality of joints 20 are arranged at an interval from each other in a cross direction X, and a second-direction joint row 40 in which a plurality of the joints 20 are arranged at an interval from each other in a longitudinal direction Y. A curvature 1/R1 in a direction along the first-direction joint row 30 in a region of the outer panel 3 corresponding to the first-direction joint row 30 is smaller than a curvature 1/R2 in a direction along the second-direction joint row 40 in a region of the outer panel 3 corresponding to the second-direction joint row 40. An interval X1 between the joints 20 in the first-direction joint row 30 is greater than an interval Y2 between the joints 20 in the second-direction joint row 40.

16 Claims, 12 Drawing Sheets

(51) Int. Cl.

| | | |
|---|---|---|
| *B62D 27/02* | (2006.01) | |
| *B62D 29/00* | (2006.01) | |
| *F16B 5/06* | (2006.01) | |
| *F16B 5/08* | (2006.01) | |

(52) U.S. Cl.

CPC ......... *B62D 29/007* (2013.01); *B62D 29/008* (2013.01); *F16B 5/0621* (2013.01); *F16B 5/08* (2013.01)

(58) Field of Classification Search

USPC .................................................. 296/193.11

See application file for complete search history.

(56) References Cited

U.S. PATENT DOCUMENTS

| | | | | |
|---|---|---|---|---|
| 7,810,877 | B2 * | 10/2010 | Ishitobi | ................... B60R 21/34 |
| | | | | 296/193.11 |
| 9,387,887 | B2 * | 7/2016 | Ishitobi | ................. B62D 25/10 |

| | | | | |
|---|---|---|---|---|
| 2004/0182616 | A1 * | 9/2004 | Mason | ................... B60R 21/34 |
| | | | | 180/69.21 |
| 2008/0007094 | A1 * | 1/2008 | Ishitobi | .................. B60R 21/34 |
| | | | | 296/193.11 |
| 2018/0001368 | A1 | 1/2018 | Otsuka et al. | |
| 2022/0097773 | A1 | 3/2022 | Yoshida et al. | |
| 2022/0126926 | A1 | 4/2022 | Nishimura et al. | |
| 2022/0274150 | A1 | 9/2022 | Yamazaki et al. | |
| 2024/0352565 | A1 | 10/2024 | Nishimura et al. | |

FOREIGN PATENT DOCUMENTS

| | | | |
|---|---|---|---|
| JP | | 6-285418 A | 10/1994 |
| JP | | 2005-193863 A | 7/2005 |
| JP | | 2009-91456 A | 4/2009 |
| JP | | 2017-1553 A | 1/2017 |
| WO | WO 2010/035478 | A1 | 4/2010 |
| WO | WO 2014/155661 | A1 | 10/2014 |
| WO | WO 2020/145198 | A1 | 7/2020 |
| WO | WO 2020/145199 | A1 | 7/2020 |
| WO | WO 2020/145200 | A1 | 7/2020 |

* cited by examiner

FIRST MODIFICATION

SECOND MODIFICATION

THIRD MODIFICATION

THIRD MODIFICATION

THIRD MODIFICATION

DIFFERENT EXAMPLE OF THE THIRD MODIFICATION

FURTHER DIFFERENT EXAMPLE OF THE THIRD MODIFICATION

FOURTH MODIFICATION

FOURTH MODIFICATION

FOURTH MODIFICATION

AUTOMOTIVE EXTERIOR COMPONENT

TECHNICAL FIELD

The present invention relates to an automotive exterior component.

BACKGROUND ART

Patent Document 1 discloses a hood panel for a vehicle as an automotive exterior component. The principle purpose of the hood panel is to reduce the degree of injury to a pedestrian if the pedestrian collides with the hood panel.

Patent Document 2 discloses a hood for an automobile as an automotive exterior component. The principle purpose of the hood for an automobile is to absorb the energy of contact when a pedestrian comes into contact with the hood for an automobile, by only deforming by a small amount in an inward direction of the automobile.

LIST OF PRIOR ART DOCUMENTS

Patent Documents

Patent Document 1: JP2005-193863A
Patent Document 2: JP2017-1553A

SUMMARY OF INVENTION

Technical Problem

In the automobile hood disclosed in Patent Document 1, an inner panel and an outer panel are joined using an adhesive. Mastic sealers and the like are known as adhesives for joining an inner panel and an outer panel. After the inner panel and the outer panel are joined with an adhesive, they are painted, and the paint is then baked at high temperature. During the baking, strain (thermal deformation) occurs in the outer panel due to deformation that accompanies hardening of the adhesive, which reduces the surface quality of the hood panel. For example, if the thickness of the outer panel is thin and the rigidity is low, the outer panel will deform more easily than the inner panel, and accompanying contraction of the adhesive, the outer panel will deform so as to sink inward at places where the adhesive is applied. A state of the surface at a place where such kind of thermal deformation occurred in the outer panel becomes an undulating state. Therefore, at a place where thermal deformation occurred in the outer panel, light shone onto the automotive exterior component is reflected in a direction that is different from a direction according to the shape of the surface that was intended in the design of the automotive exterior component, and such a place is visually recognized as a place where there is unnatural local unevenness. As a result, it is determined that the surface quality is low.

In particular, in recent years, due to demands to reduce the weight of automobiles, the sheet thickness of outer panels is being made thinner and the rigidity of the outer panels is becoming lower, and consequently the aforementioned thermal deformation tends to occur more easily.

A similar problem also exists with respect to other automotive exterior components having a structure joined using an adhesive, for example, the structures of back doors, side doors, and roofs. That is, the above problem is present in a structure that has an outer panel and an inner that is joined to the outer panel with an adhesive. Note that, in the present description, the term "inner" means a member which is arranged on the inner side of a vehicle body relative to an outer panel, such as an inner panel, a stiffening member, or a reinforcing member, and which constitutes an automotive exterior component.

On the other hand, in Patent Document 1 and Patent Document 2, there is no particular disclosure pertaining to surface quality being lowered by strain of an outer panel which is caused by deformation due to heat of an adhesive such as a mastic sealer.

One objective of the present invention is to provide an automotive exterior component that can reduce thermal deformation in an outer panel.

Solution to Problem

The gist of the present invention is an automotive exterior component which is described hereunder.

(1) An automotive exterior component, including:
an outer panel,
an inner that is arranged along the outer panel on an inner side of a vehicle body relative to the outer panel, and
a plurality of joints having a spot shape that join the outer panel and the inner,
the automotive exterior component having:
a first-direction joint row in which the plurality of joints are arranged at an interval from each other in an aligned relationship in a first direction, and
a second-direction joint row in which the plurality of joints are arranged at an interval from each other in an aligned relationship in a second direction that is perpendicular to the first direction,
wherein:
a curvature in a direction along the first-direction joint row in a region of the outer panel corresponding to the first-direction joint row is smaller than a curvature in a direction along the second-direction joint row in a region of the outer panel corresponding to the second-direction joint row; and
the interval between the plurality of joints in the first-direction joint row is greater than the interval between the joints in the second-direction joint row.

(2) The automotive exterior component according to the above (1), wherein:
the inner includes a plurality of units;
the units each include an annular flange which is arranged adjacent to the outer panel, an inclined wall that extends from the flange so as to separate from the outer panel, and a bottom portion that is continuous with the inclined wall and is separated from the flange; and
the joint is arranged at the flange in the unit.

(3) The automotive exterior component according to the above (2), wherein:
the unit is formed in a polygonal shape or a circular shape as viewed from a sheet thickness direction of the outer panel, and
the automotive exterior component includes a configuration in which the plurality of units are disposed in a close-packed arrangement.

(4) The automotive exterior component according to the above (3), wherein:
the polygonal shape is a hexagonal shape.

(5) The automotive exterior component according to the above (3) or the above (4), wherein:
the joints of the first-direction joint row and the joints of the second-direction joint row are arranged in all of the plurality of polygonal or circular units.

(6) The automotive exterior component according to any
   one of the above (2) to the above (5), wherein:
three, four, or six of the joints are arranged at the flange
   in the unit.
(7) The automotive exterior component according to the
   above (6), wherein:
the joints are arranged in a predetermined pattern at each
   of the flanges where the first-direction joint row and the
   second-direction joint row are arranged.
(8) The automotive exterior component according to any
   one of the above (2) to the above (7), wherein:
at the flange where the first-direction joint row and the
   second-direction joint row are arranged, the joints are
   arranged at an equal pitch in a circumferential direction
   of the flange.
(9) The automotive exterior component according to any
   one of the above (2) to the above (7), wherein:
a joint-equipped unit as the unit in which the joint is
   provided, is provided in plurality, and
a distance between centers as viewed in the sheet thick-
   ness direction of two of the joint-equipped units that are
   adjacent to each other is 200 mm or less.
(10) The automotive exterior component according to the
   above (9), wherein:
15 or more of the joint-equipped units in which the joints
   are arranged in a predetermined pattern are arranged.
(11) The automotive exterior component according to any
   one of the above (1) to the above (10), further having:
an oblique-direction joint row in which the plurality of
   joints are arranged in an aligned relationship in a
   direction that obliquely intersects with the first-direc-
   tion joint row.
(12) The automotive exterior component according to the
   above (11), wherein:
each of the joints in the oblique-direction joint row is the
   joint of the first-direction joint row and is the joint of
   the second-direction joint row.
(13) The automotive exterior component according to any
   one of the above (1) to the above (12), wherein:
the outer panel is a hood outer panel.
(14) The automotive exterior component according to the
   above (13), wherein: the first direction is a vehicle body
   cross direction.
(15) The automotive exterior component according to any
   one of the above (1) to the above (14), wherein:
the outer panel is a steel sheet having a sheet thickness of
   0.60 mm or less, and
the inner is a steel sheet having a sheet thickness of 0.50
   mm or less.
(16) The automotive exterior component according to any
   one of the above (1) to the above (14), wherein:
the outer panel is an aluminum sheet having a sheet
   thickness of 0.75 mm or less, and
the inner is an aluminum sheet having a sheet thickness of
   0.75 mm or less.

Advantageous Effect of Invention

According to the present invention, thermal deformation
in an outer panel can be reduced.

4

Figure 2:
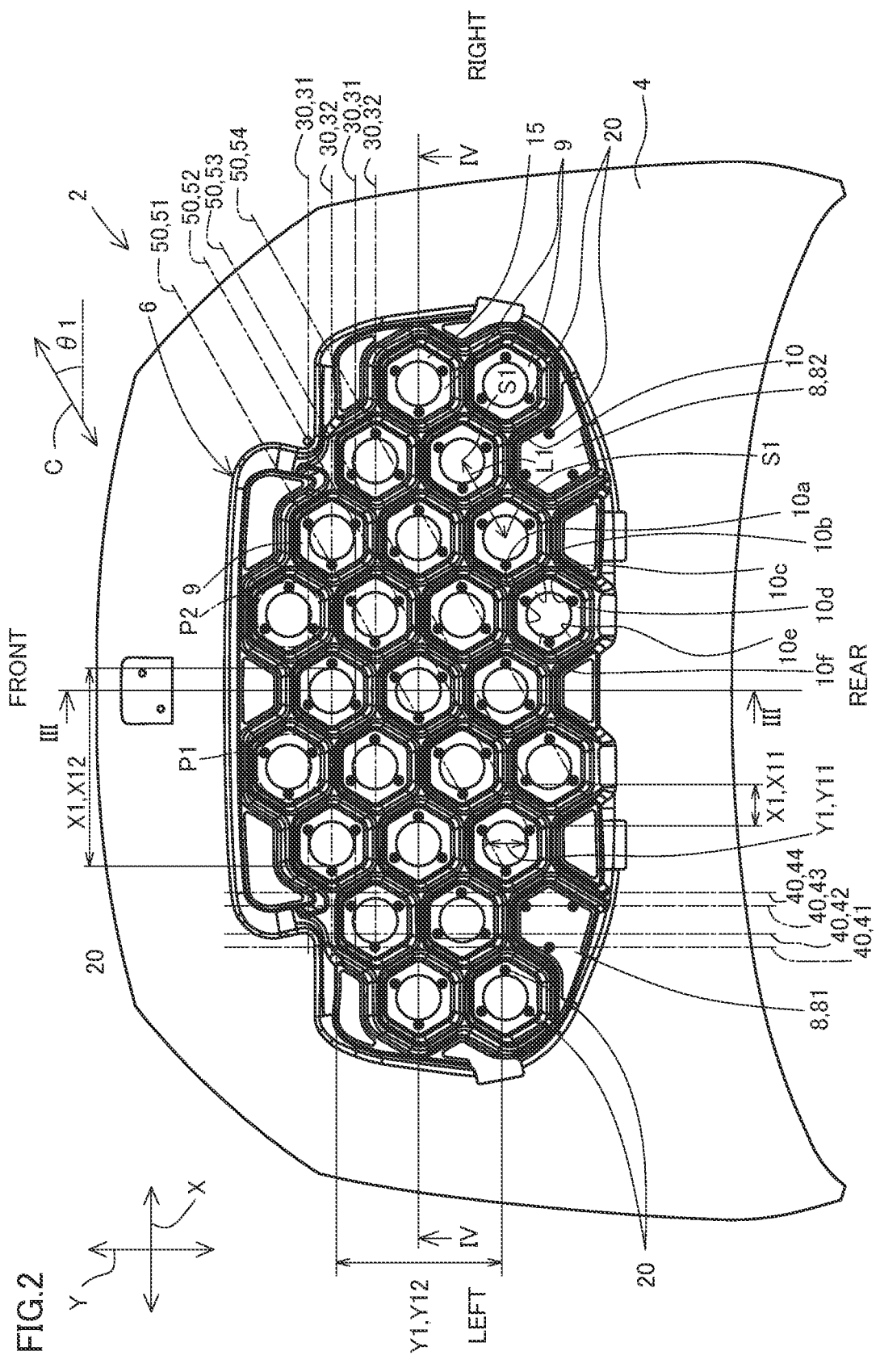
Figure 3:
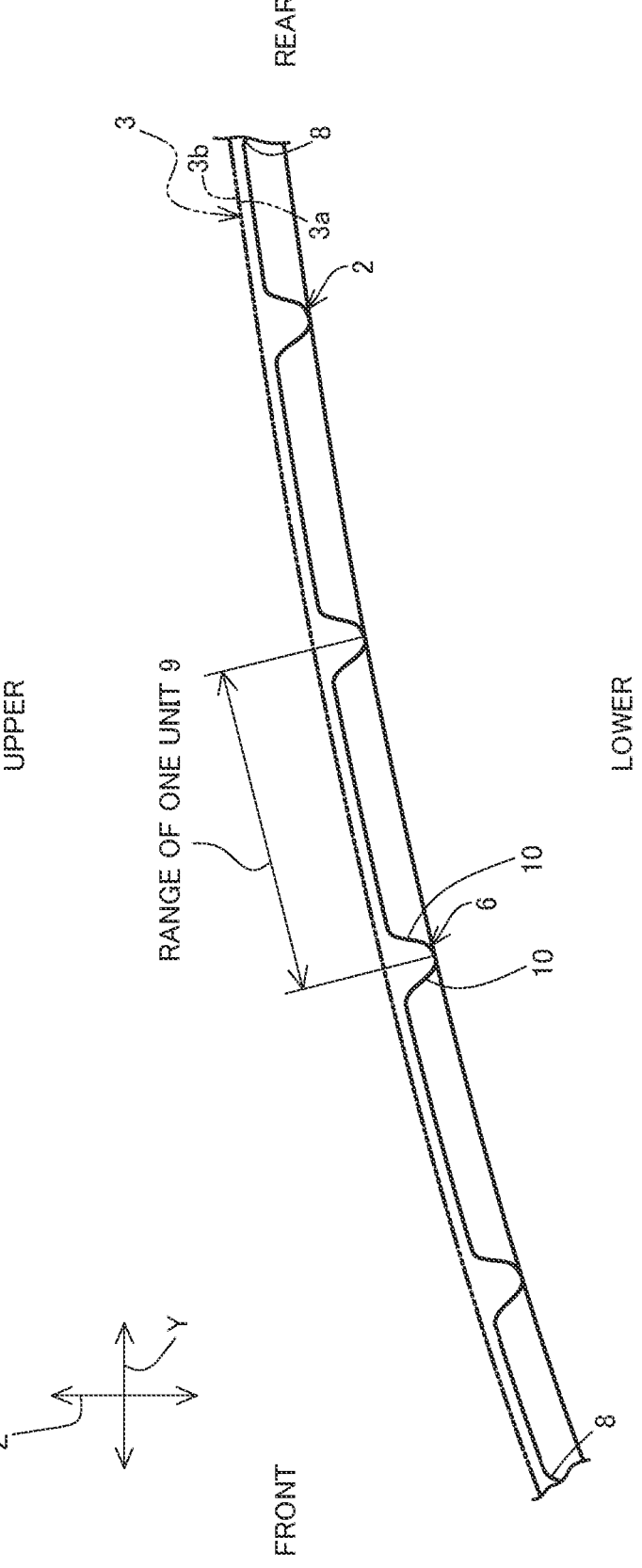
Figure 4:
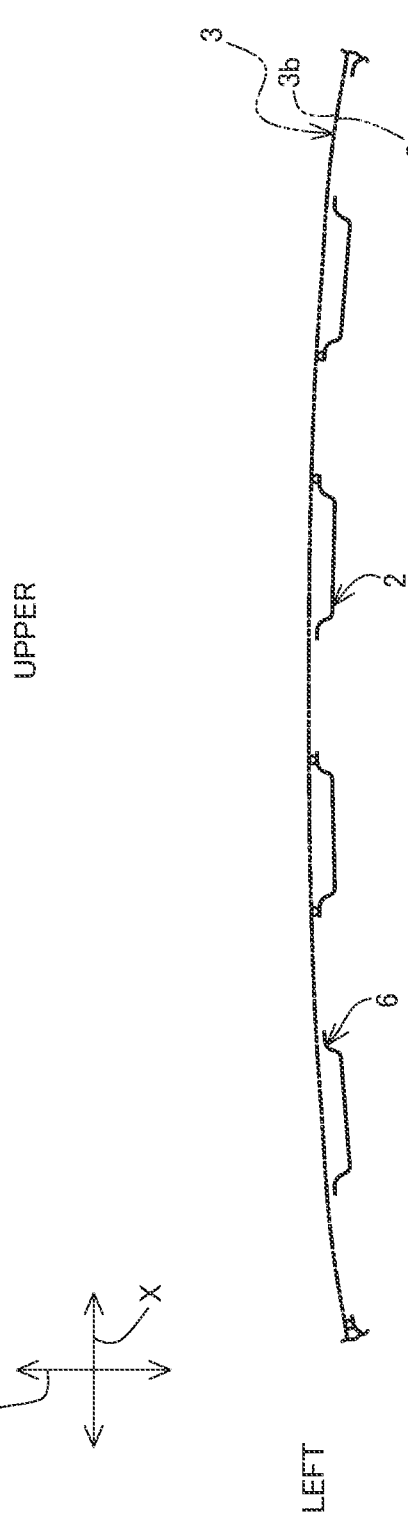
Figure 5A:
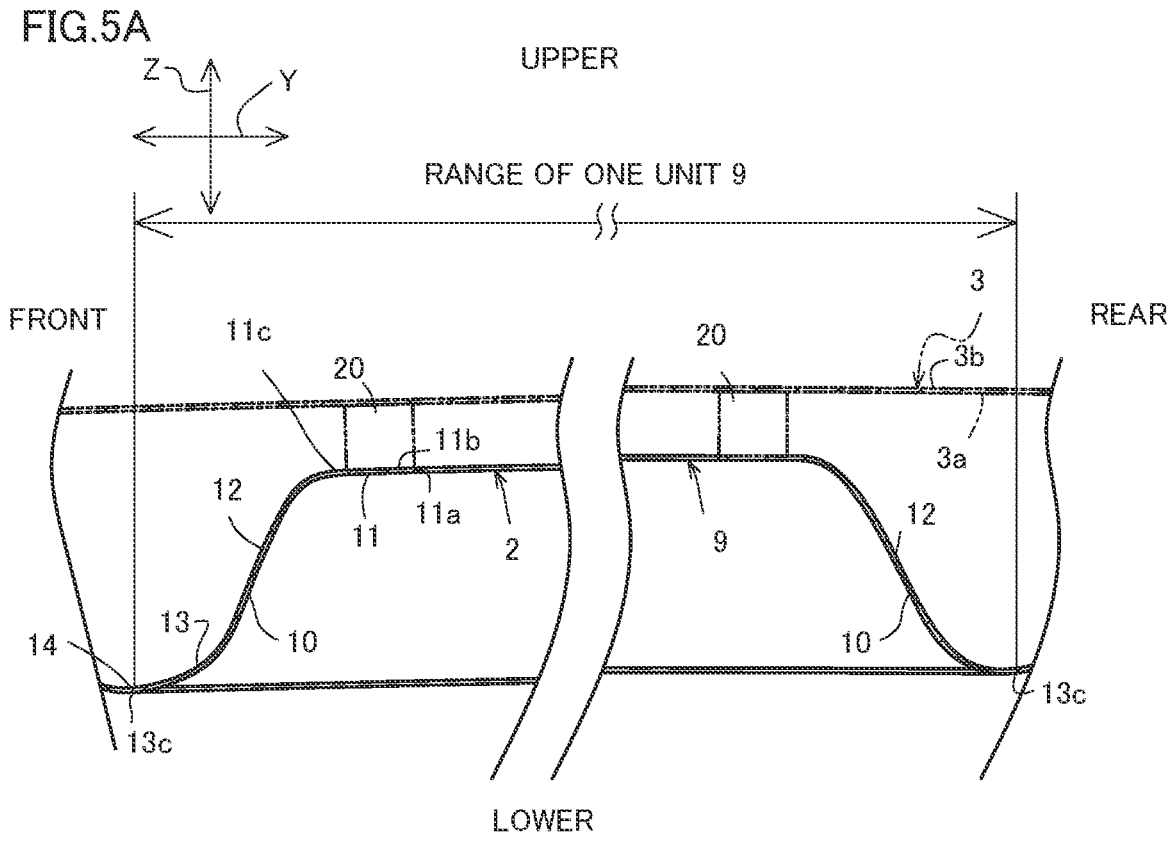
Figure 5B:
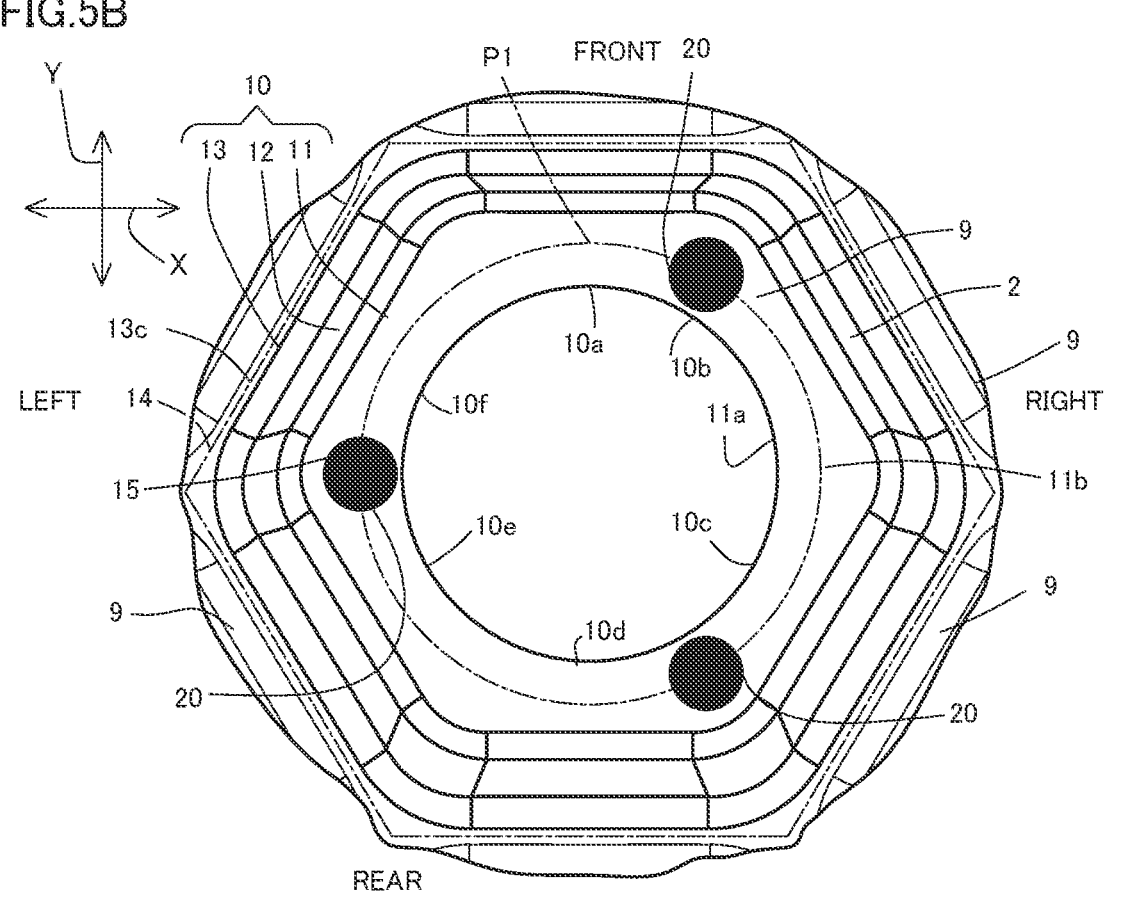
Figure 6:
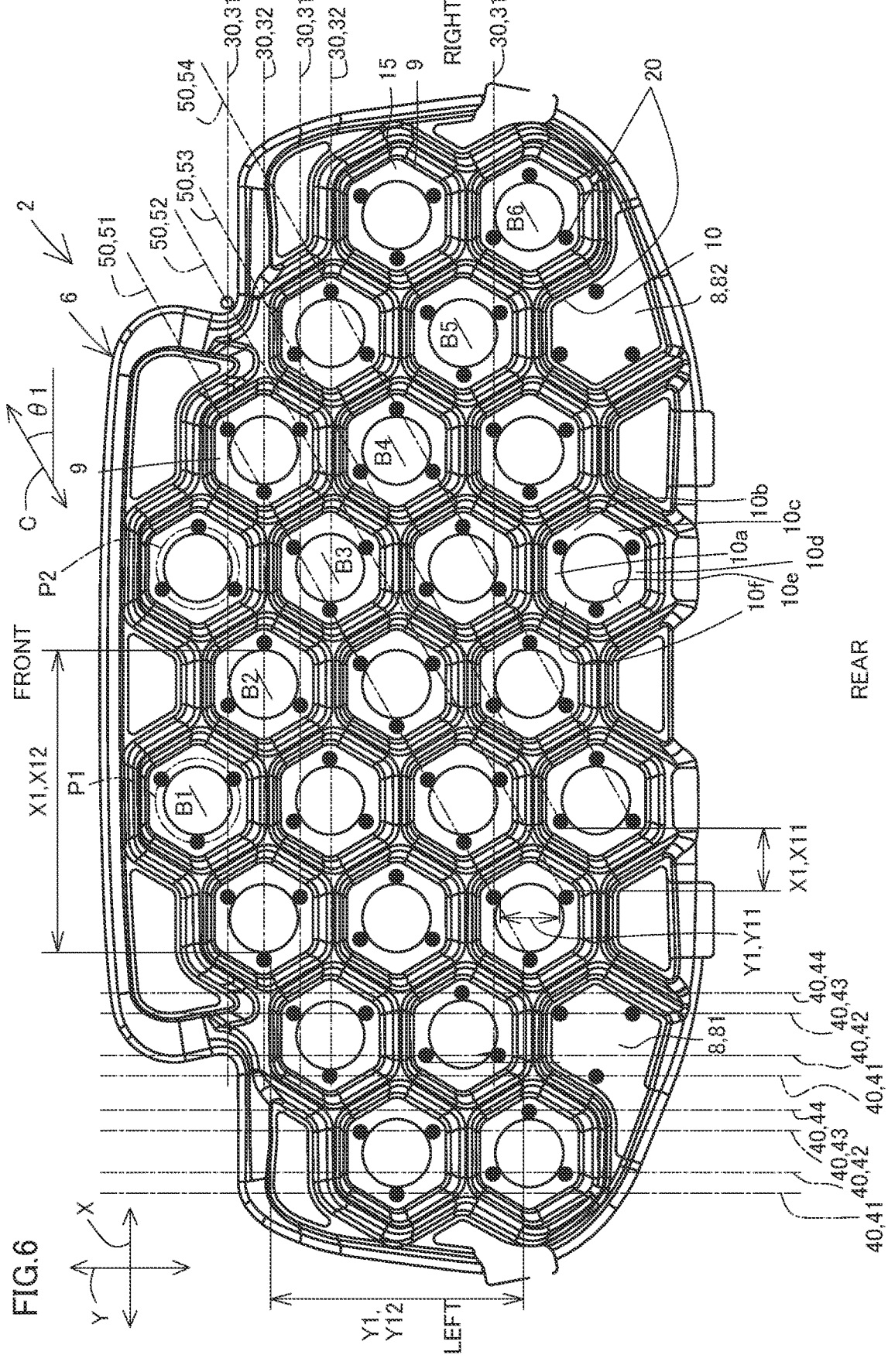
Figure 7:
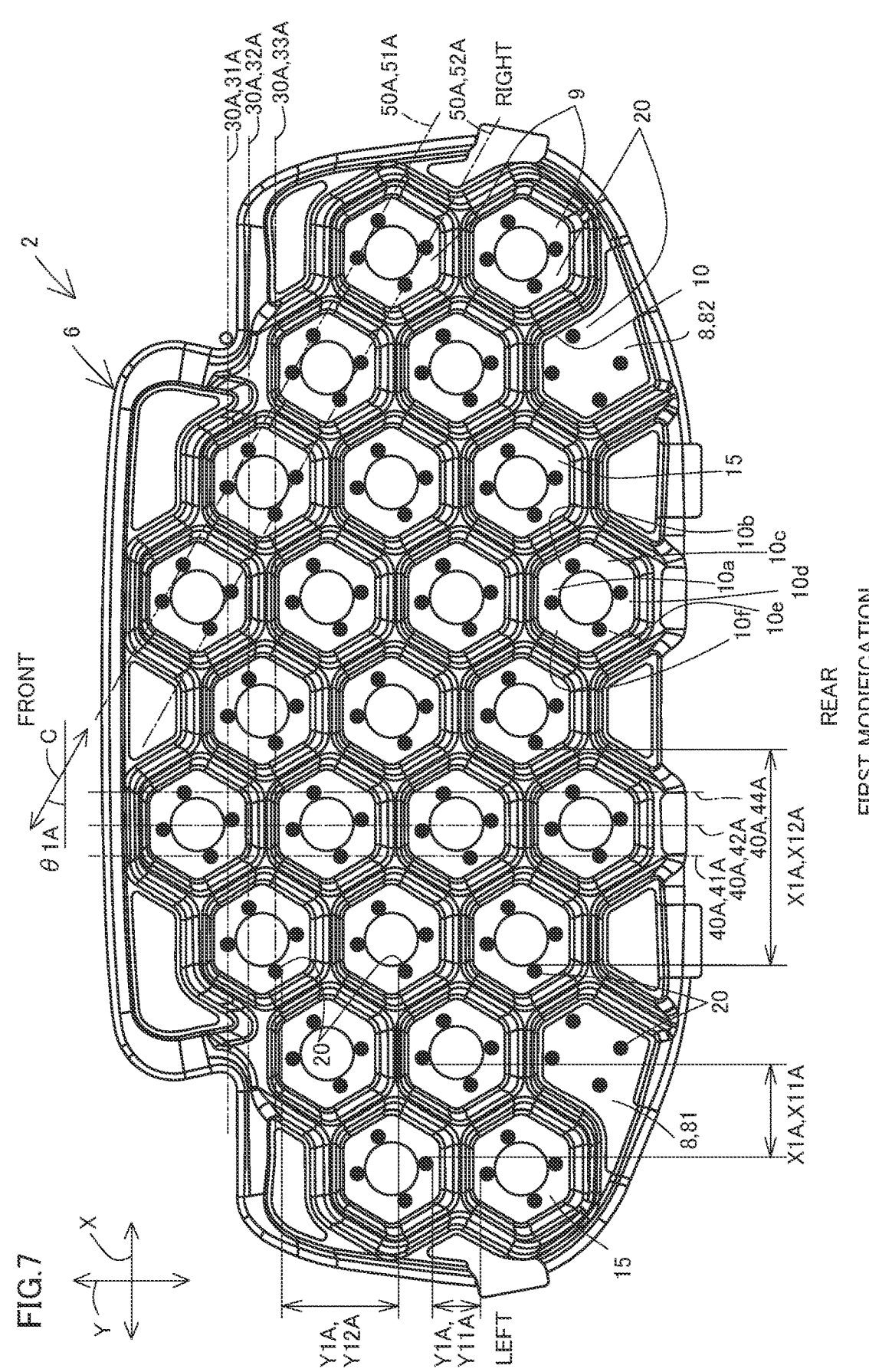
Figure 8:
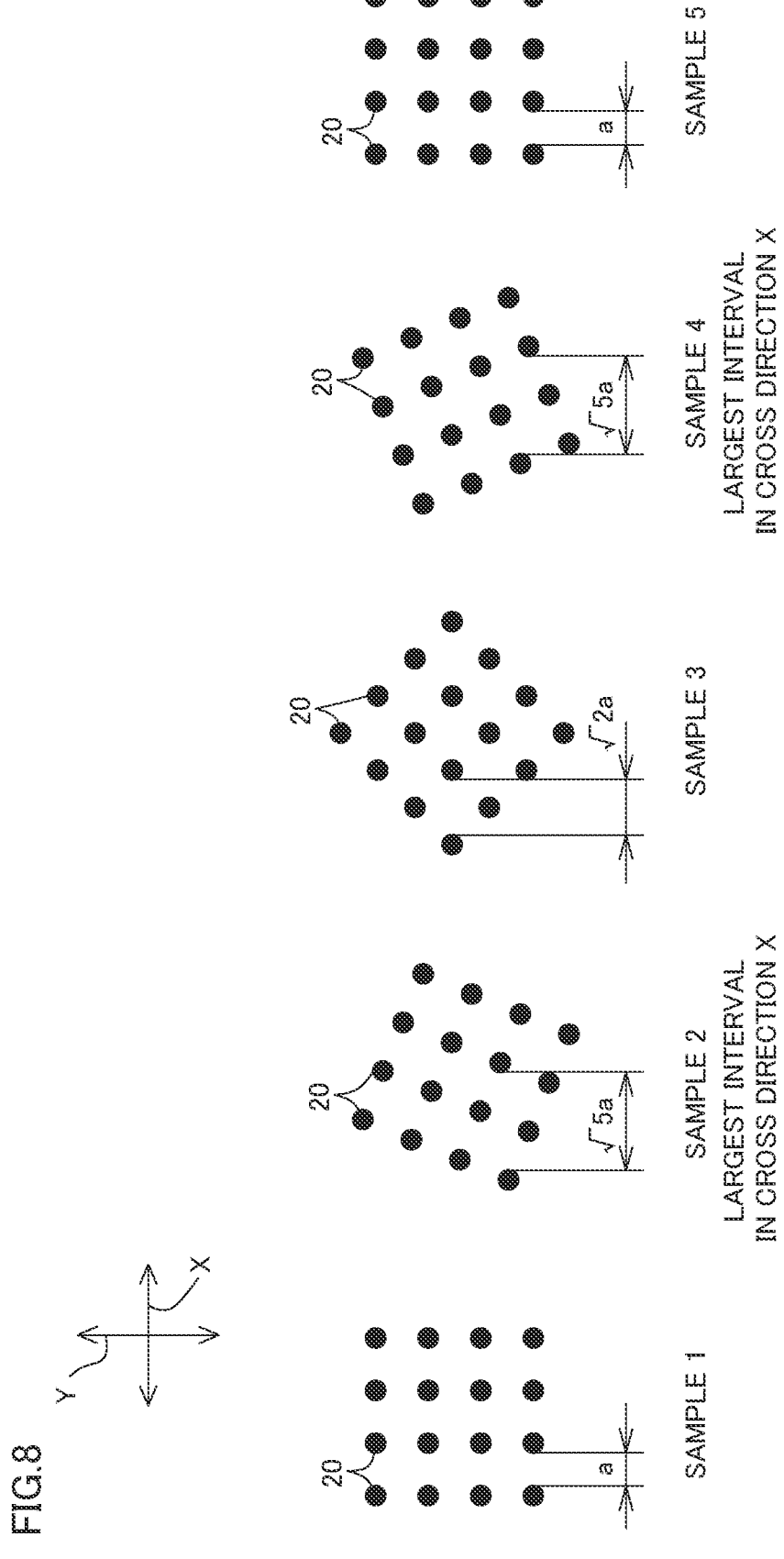
Figure 9:
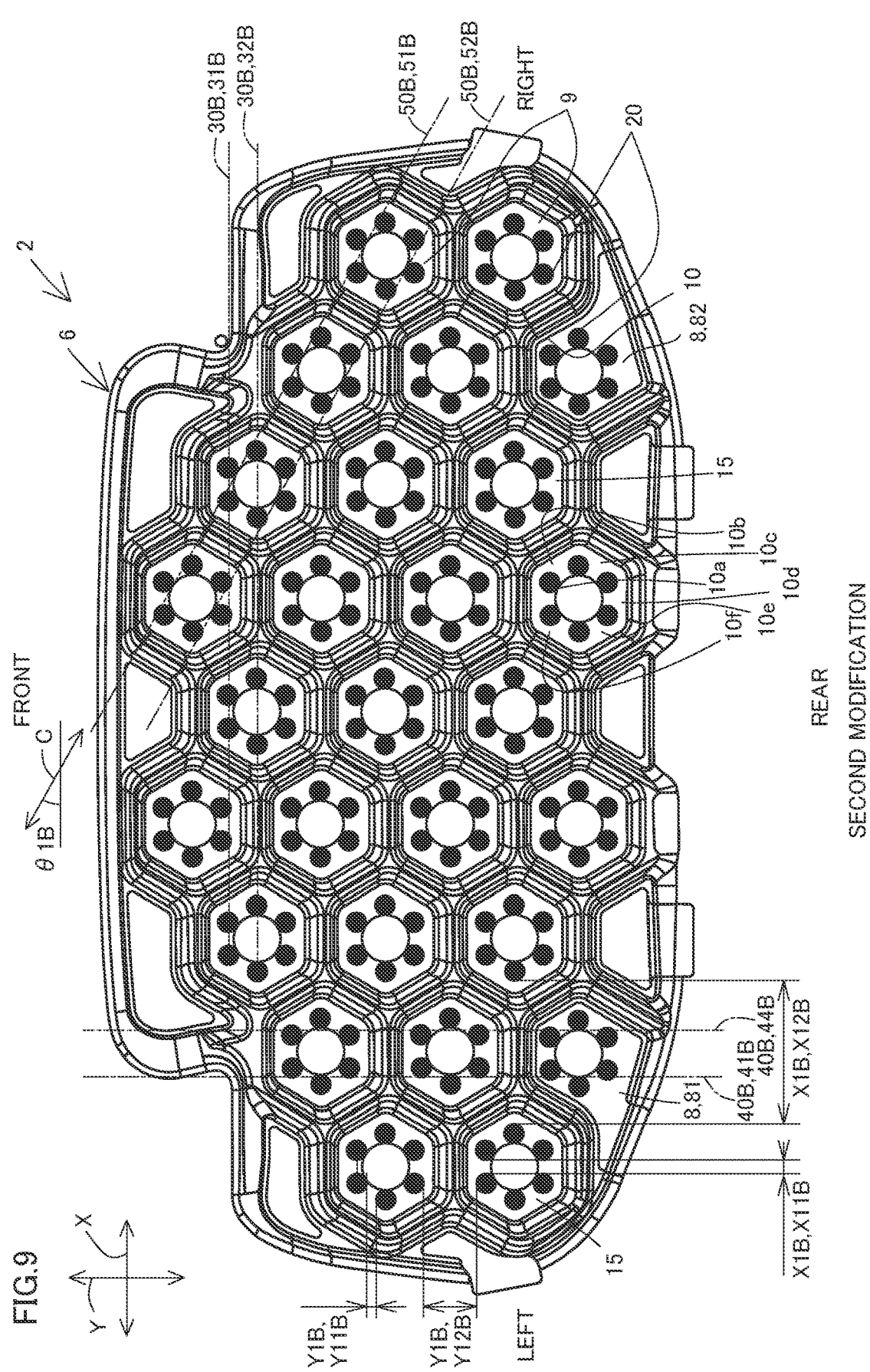
Figure 10A:
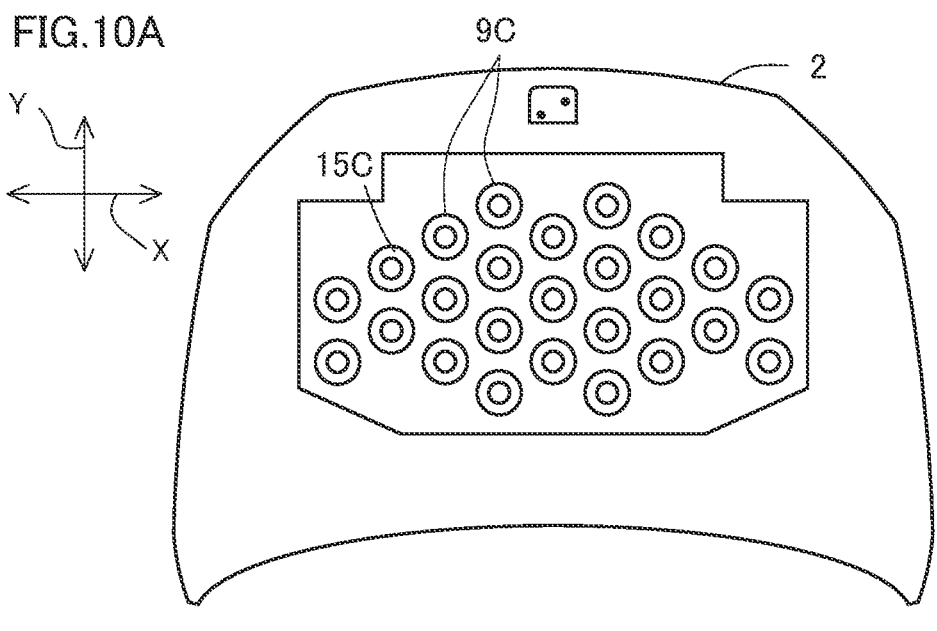
Figure 10B:
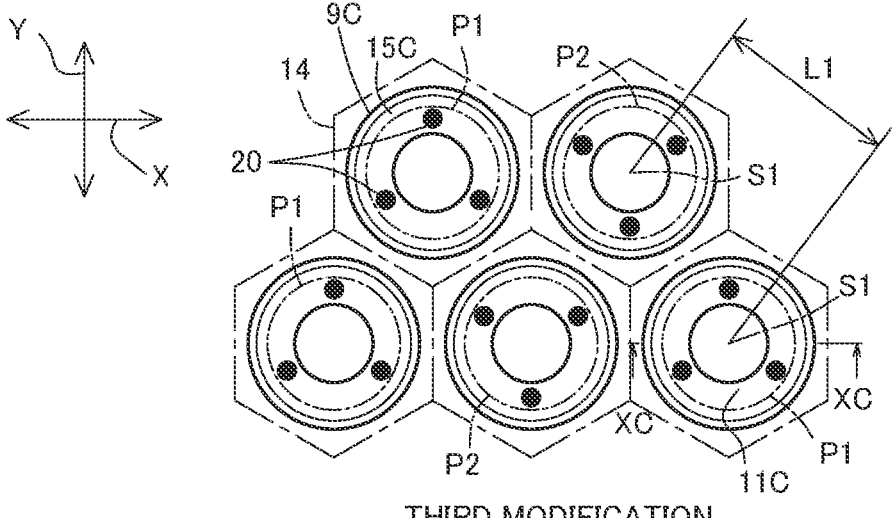
Figure 10C:
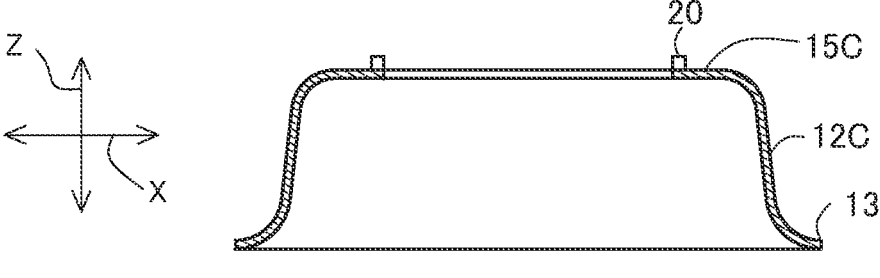
Figure 11A:
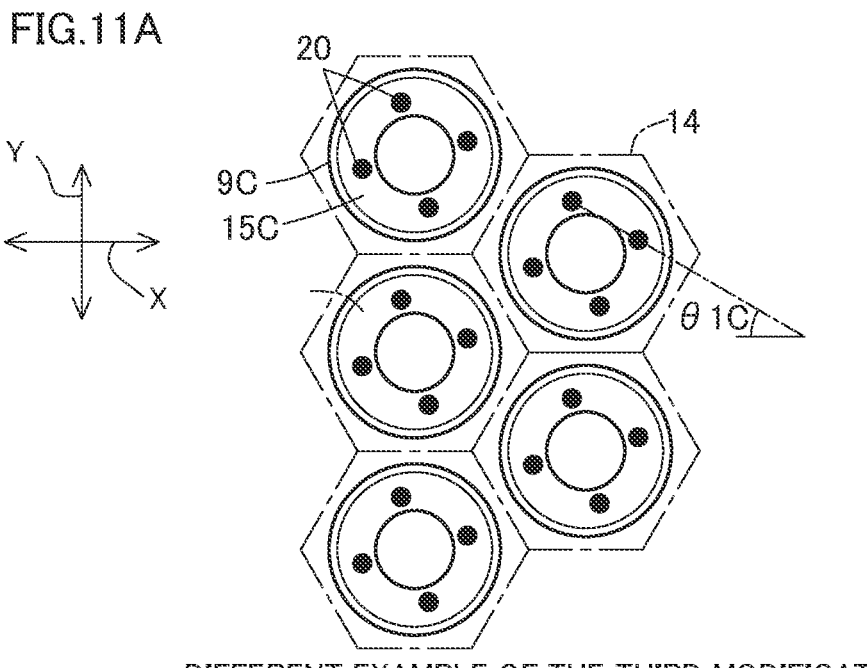
Figure 11B:
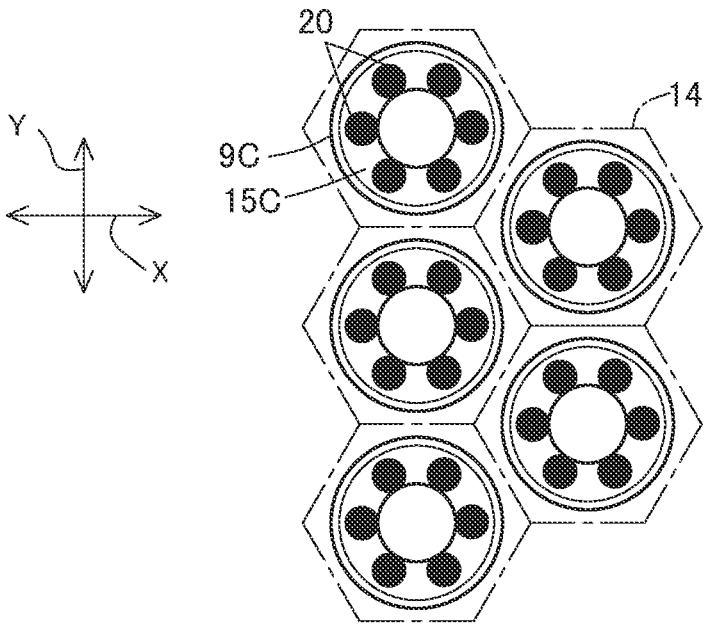
Figure 12A:
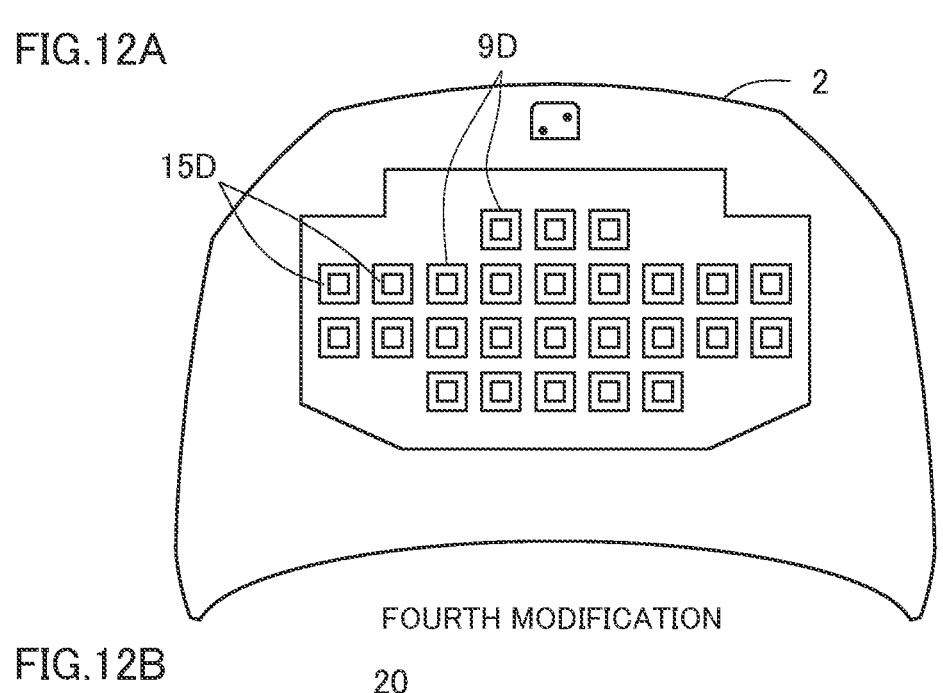
Figure 12B:
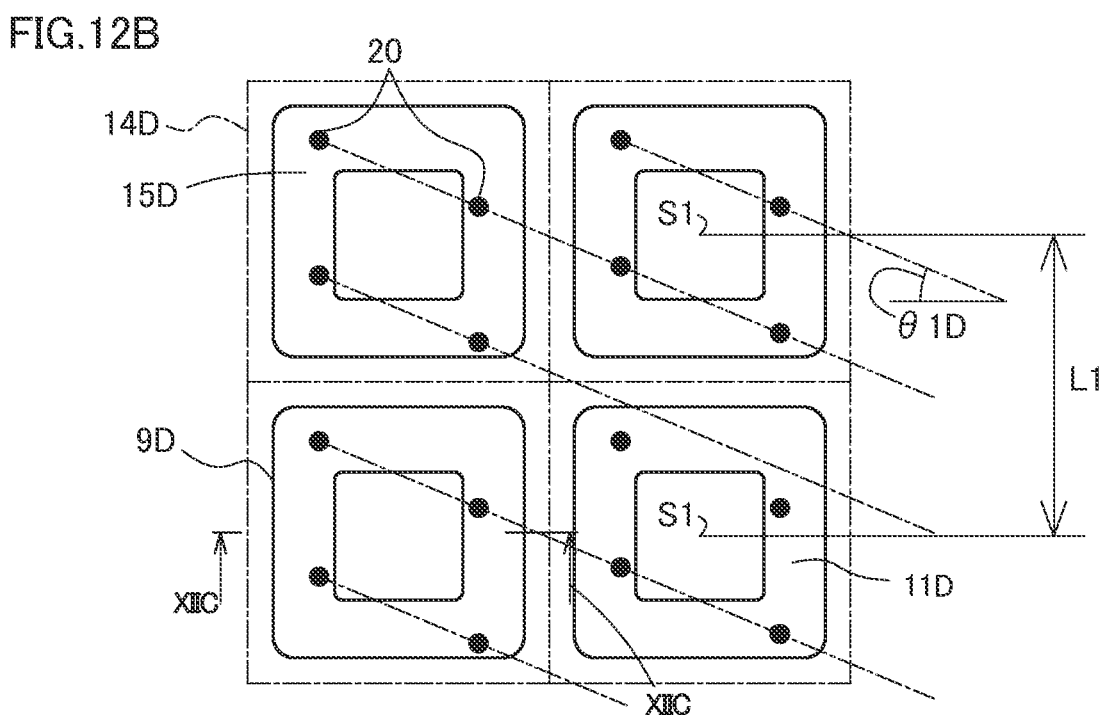
Figure 12C:
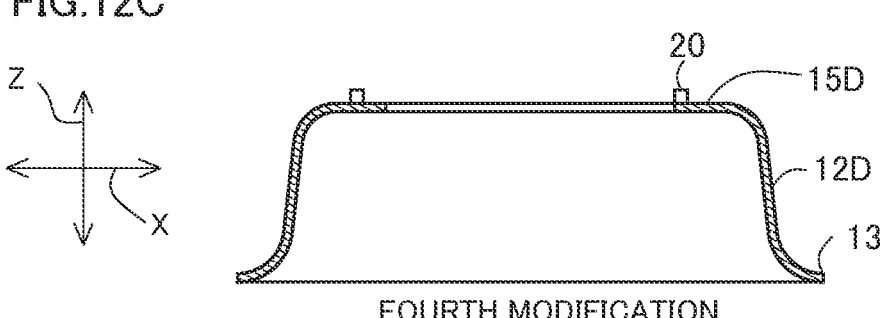

FIG. 2 is a plan view of an inner panel of the automobile
hood.
FIG. 3 is a schematic cross-sectional view along a line
III-III in FIG. 2, in which illustration of a portion that
appears to the rear of the cross section is omitted.
FIG. 4 is a cross-sectional view along a line IV-IV in FIG.
2, in which illustration of a portion that appears to the rear
of the cross section is omitted.
FIG. 5A is a view in which one part of FIG. 3 is enlarged,
and FIG. 5B is a view in which one unit is enlarged.
FIG. 6 is an enlarged view of an overhanging structure
illustrated in FIG. 2.
FIG. 7 is a view illustrating a principal part of a first
modification.
FIG. 8 is a schematic diagram for describing intervals
between the joints.
FIG. 9 is a view illustrating a principal part of a second
modification.
FIG. 10A is a schematic plan view illustrating a principal
part of a third modification. FIG. 10B is a plan view
illustrating a principal part of FIG. 10A. FIG. 10C is a
cross-sectional view along a line XC-XC in FIG. 10B.
FIG. 11A is a view illustrating a principal part of a
different example of the third modification, and FIG. 11B is
a view illustrating a principal part of a further different
example of the third modification.
FIG. 12A is a schematic plan view illustrating a principal
part of a fourth modification. FIG. 12B is a plan view
illustrating a principal part of FIG. 12A. FIG. 12C is a
cross-sectional view along a line XIIC-XIIC in FIG. 12B.

DESCRIPTION OF EMBODIMENT

Hereunder, first, the circumstances leading to the concep-
tion of the present invention will be described, and then an
embodiment will be described in detail.
[Circumstances Leading to Conception of Present Inven-
tion]
Generally, in an automobile panel, the outer panel is a
comparatively flat shape, while the inner panel is a shape
having unevenness. Further, when producing an automobile
hood, a sealer (adhesive) such as a mastic sealer is applied
at places on the inner panel that are convex toward the outer
panel side. The sealer contacts the inner panel and the outer
panel, and becomes a joint that joins these panels together.
As mentioned above, after an inner panel and an outer
panel are joined together by joints, they are painted, and the
paint is then baked at high temperature. During the baking,
strain (thermal deformation) occurs in the outer panel due to
deformation that accompanies hardening of the joints, which
reduces the surface quality of the hood of an automobile. For
example, if the thickness of the outer panel is thin and the
rigidity is low, at a place where a joint extends continuously
over a long range, the outer panel will deform so as to sink
inward due to thermal deformation. Further, in a case where
an arrangement interval between the joints is short, there is
a tendency for an imbalance with respect to a force that
deforms the outer panel in the sheet thickness direction to
increase due to the interaction between the joints, and
consequently the thermal deformation in the outer panel
increases. A state of the surface at a place where such kind
of thermal deformation occurred in the outer panel becomes
an undulating state. Therefore, at a place where thermal
deformation occurred in the outer panel, light shone onto the
outer panel is reflected in a direction that is different from a
direction according to the shape of the surface that was
intended in the design of the automobile hood, and such a place is visually recognized as a place where there is unnatural local unevenness. As a result, it is determined that the surface quality is low. In particular, in recent years, due to demands to reduce the weight of automobiles, the sheet thickness of outer panels is being made thinner, and the rigidity of the outer panels is becoming lower, and consequently the aforementioned thermal deformation tends to occur more easily.

Based on the above background, the inventors of the present application conducted intensive research, and as a result, from the viewpoint of reducing thermal deformation in the outer panel, focused their attention on arranging the sealer in a dotted shape and not a linear shape, and in addition, optimizing the arrangement of the sealer. Specifically, the inventors of the present application noticed that, in an outer panel, if sealer is applied in a direction with a small curvature, the influence of the thermal deformation will be conspicuous. In addition, the inventors of the present application arrived at an idea that by adopting a configuration in which individual pieces of sealer are separated from each other as much as possible in a direction with a small curvature, it is possible to reduce thermal deformation in the outer panel, and thereby arrived at the invention of the present application. Hereunder, an example of the present invention is specifically described.

DESCRIPTION OF EMBODIMENT

Hereunder, an embodiment of the present invention is described while referring to the accompanying drawings. Note that, in the present embodiment, an automobile hood is described as one example of an automotive exterior component. However, the present invention can be applied to any automotive exterior component as long as the automotive exterior component has an outer panel, an inner, and a joint that joins the inner and the outer panel to each other. Examples of such kinds of automotive exterior components that can be mentioned include a door panel such as a panel for a side door or a back door, a roof panel including a roof outer panel, a fender panel, and a quarter panel.

Figure 1:
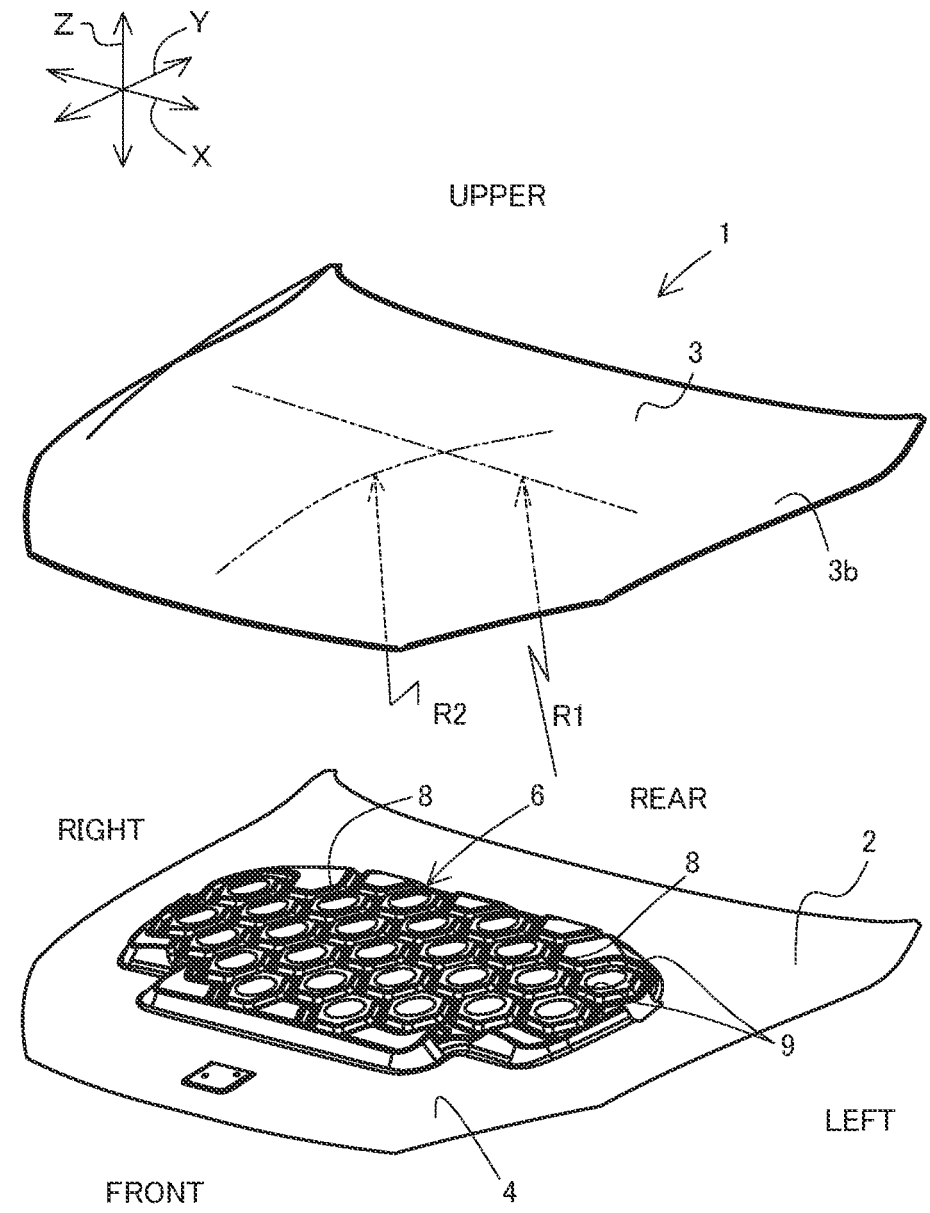
FIG. 1 is a schematic exploded perspective view of an
automobile hood according to one embodiment of the pres-
ent invention, in which illustration of a joint is omitted.

FIG. 1 is a schematic exploded perspective view of an automobile hood 1 according to one embodiment of the present invention, in which illustration of a joint 20 is omitted. FIG. 2 is a plan view of an inner panel 2 of the automobile hood 1. FIG. 3 is a schematic cross-sectional view along a line III-III in FIG. 2, in which illustration of a portion that appears to the rear of the cross section is omitted. FIG. 4 is a cross-sectional view along a line IV-IV in FIG. 2, in which illustration of a portion that appears to the rear of the cross section is omitted. Note that, in FIG. 3 and FIG. 4, an outer panel 3 that does not appear in FIG. 2 is indicated by a chain double-dashed line that is a virtual line. FIG. 5A is a view in which one part of FIG. 3 is enlarged. FIG. 5B is a view in which one unit 9 is enlarged. FIG. 6 is an enlarged view of an overhanging structure 6 illustrated in FIG. 2. Hereinafter, unless otherwise specified, the embodiment will be described with reference to FIG. 1 to FIG. 6 as appropriate.

The automobile hood 1 is a front hood that is provided at a front part of an automobile, and is also called a "bonnet". An automobile in which the automobile hood 1 is provided is, for example, a passenger vehicle. A sedan-type passenger vehicle, a coupe-type passenger vehicle, a hatchback-type passenger vehicle, a minivan-type passenger vehicle, an SUV (sport utility vehicle)-type passenger vehicle and the like can be mentioned as examples of the passenger vehicle.

Note that, in the present description, the terms "front", "rear", "left", "right", "upper", and "lower" are used taking a time when the automobile hood 1 is mounted to an automobile and the automobile hood 1 is closed as the basis. The term "front" refers to a direction in which the automobile advances. The term "rear" refers to a direction in which the automobile reverses. The term "right" refers to a turning direction of the automobile when the automobile which is advancing turns to the right. The term "left" refers to a turning direction of the automobile when the automobile which is advancing turns to the left. Further, in the present embodiment, a cross direction of vehicle of the automobile to which the automobile hood 1 is mounted is referred to as a "cross direction X". Further, a vehicle length direction of the automobile to which the automobile hood 1 is mounted is referred to as a "longitudinal direction Y". Furthermore, a vehicle height direction of the automobile to which the automobile hood 1 is mounted is referred to as a "height direction Z". In a case where the present invention is applied to an automotive exterior component other than the automobile hood 1, in some cases the cross direction X, the longitudinal direction Y, and the height direction Z may not match the cross direction of vehicle, the vehicle length direction, and the vehicle height direction of the automobile.

The automobile hood 1 has the inner panel 2, the outer panel 3 that is supported by the inner panel 2, and a plurality of the spot-shaped joints 20 which join these panels 2 and 3 to each other.

In the automobile hood 1, the outer panel 3 is a portion that constitutes a part of the outer surface of the automobile. The outer panel 3 is formed of, for example, a metal material such as a mild steel sheet or a high-tensile strength steel sheet. Examples of the high-tensile strength steel sheet that can be mentioned include steel sheets having a tensile strength of 340 MPa or more, for example, a steel sheet having a tensile strength of 440 MPa or more. The outer panel 3 is formed, for example, by subjecting a single steel sheet to press working or the like. The sheet thickness of the outer panel 3 is, for example, 0.25 mm to 1.20 mm, and preferably is 0.6 to 0.7 mm. The outer panel 3 may be an aluminum alloy sheet. In a case where the outer panel 3 is an aluminum alloy sheet, the sheet thickness of the outer panel 3 is 0.40 to 1.20 mm, and preferably is 0.8 to 1.0 mm. Other than the curvature which is described later, there are no particular restrictions with regard to the shape of the outer panel 3.

The inner panel 2 is arranged along the outer panel 3 at a position that is on the inner side of the vehicle body relative to the outer panel 3. The inner panel 2 stiffens the outer panel 3 by being joined to an undersurface 3a of the outer panel 3 using the joints 20. By this means, the inner panel 2 increases the panel rigidity of the outer panel 3.

Note that, the term "panel rigidity" refers to the rigidity of the relevant panel in a case where a force from outside acts on a press-formed product which has a comparatively moderately curving surface and in which the surface area is extremely large relative to the sheet thickness, for example, an outer panel of an automobile hood. The panel rigidity corresponds to a feeling of elastic resistance or a sensation of deflection deformation w % ben the panel is pressed with a hand. This characteristic is usually represented by the deflection when a load is applied, and the smaller the deflection is when a constant load is applied, the higher the panel rigidity is.

The inner panel 2 is formed, for example, of a metal material such as a mild steel sheet or a high-tensile strength steel sheet. The inner panel 2 is formed, for example, by subjecting a single steel sheet to press working. The inner panel 2 may be an integrally formed product, or may be formed by joining a plurality of members together. In the present embodiment, the inner panel 2 is an integrally formed product. The sheet thickness (thickness of the steel sheet) of the inner panel 2 is for example, 0.25 mm to 1.20 mm, and preferably is 0.55 mm to 0.60 mm. The sheet thickness of the inner panel 2 may be less than the sheet thickness of the outer panel 3, may be the same as the sheet thickness of the outer panel 3, or may be greater than the sheet thickness of the outer panel 3. Note that, the inner panel 2 may be an aluminum alloy sheet. In a case where the inner panel 2 is an aluminum alloy sheet, the sheet thickness of the inner panel 2 is 0.40 mm to 1.20 mm, and preferably is about 0.8 mm.

Note that, with regard to the inner panel 2 and the outer panel 3, as a more preferable configuration, the outer panel 3 is a steel sheet having a sheet thickness of 0.25 mm to 0.60 mm (0.60 mm or less), and the inner panel 2 is a steel sheet having a sheet thickness of 0.25 mm to 0.50 mm (0.50 mm or less). According to this configuration, the panel rigidity and the dent resistance of the outer panel 3 can be further increased while also achieving an increase in the strength and a reduction in the weight of the automobile hood 1.

The term "dent resistance" refers to the difficulty for a dent (dent mark) to be left after removing the load in a case where a localized load is applied to a panel for some reason. In a case of the body of an actual automobile, a dent mark occurs when an outside panel of a door or the like is strongly pressed with a finger or the palm of a hand, or when the automobile body is hit by a flying stone while travelling and the like. A dent mark occurs as a result of a place on a panel at which a load has been applied is plastically deforming. Therefore, when the strain on a panel at a time that a load is applied to the panel reaches a certain magnitude, the strain remains even after the load is removed, and a dent mark occurs. The minimum value of a load that generates a certain residual strain in a panel is referred to as a "dent load", and the larger the dent load is, the better the dent resistance is.

Further, with regard to the inner panel 2, as a further preferable configuration, the inner panel 2 is a steel sheet having a sheet thickness of 0.25 mm to 0.50 mm, and as a still further preferable configuration, the inner panel 2 is a steel sheet having a sheet thickness of 0.25 to 0.45 mm. According to this configuration, the panel rigidity and the dent resistance of the outer panel 3 can be sufficiently secured while achieving an even greater reduction in the weight of the automobile hood 1.

On the other hand, as a preferable configuration in a case where the inner panel 2 and the outer panel 3 are both aluminum sheets, the sheet thickness of the outer panel 3 is 0.40 to 0.75 mm (0.75 mm or less), and the sheet thickness of the inner panel 2 is 0.40 to 0.75 mm (0.75 mm or less). According to this configuration, the panel rigidity and the dent resistance of the outer panel 3 can be sufficiently secured while achieving an even greater reduction in the weight of the automobile hood 1.

Note that, the inner panel 2 may be made of resin such as synthetic resin or a fiber-reinforced plastic. Further, an inner, such as a stiffening member, that is other than the inner panel 2 may be used as an inner that supports the outer panel 3.

The inner panel 2 has an outer circumferential portion 4, and an overhanging structure 6 arranged so as to be surrounded by the outer circumferential portion 4.

The outer circumferential portion 4 is an outer circumferential part of the inner panel 2. When the outer panel 3 closes an engine compartment, a part in the vicinity of the outer circumferential portion 4 of the inner panel 2 is received by the vehicle body (not illustrated). By this means, a load that acts on an upper face 3*b* of the outer panel 3 is received by the vehicle body through the inner panel 2. The overhanging structure 6 is arranged so as to be surrounded by the outer circumferential portion 4.

The overhanging structure 6 has a three-dimensional structure which is provided in order to receive a load acting on the upper face 3*b* of the outer panel 3. The overhanging structure 6 has a configuration in which members that have a hat-shaped cross section (a V-shaped cross section or a U-shaped cross section) are combined.

The overhanging structure 6 has a plurality of incomplete units 8 which are adjacent to the outer circumferential portion 4 and are continuous with the outer circumferential portion 4, and a plurality of units 9.

The units 9 adjacent to the outer circumferential portion 4 of the inner panel 2 are connected to the outer circumferential portion 4 directly or through the incomplete units 8. The units 9 are arranged in plurality in an aligned relationship in the cross direction X as viewed in the sheet thickness direction of the outer panel 3, and also arranged in plurality in an aligned relationship in the longitudinal direction Y that is perpendicular to the cross direction X. Note that, it suffices that the units 9 are arranged in plurality in an aligned relationship in each of two directions (first direction and second direction) which intersect with each other as viewed in the sheet thickness direction of the outer panel 3.

The incomplete unit 8 has a configuration equivalent to a configuration in which one portion of the unit 9 has been cut off along the circumferential direction of the polygonal (in the present embodiment, hexagonal) unit 9. The incomplete unit 8 has a sub-unit 10 that is similar to a sub-unit 10 of the unit 9 that is described later. A more detailed configuration of the incomplete unit 8 is described later.

Each unit 9 is formed in a polygonal (in the present embodiment, hexagonal) annular shape in plan view in the height direction Z (as viewed in the sheet thickness direction of the outer panel 3). Hereinafter, when simply the term "plan view" is used, it means a plan view in the height direction Z. By forming each unit 9 in a small polygonal shape, the inner panel 2 can be made lightweight and the inner panel 2 can also be provided with high rigidity.

In the present embodiment, each unit 9 is formed in the shape of a substantially regular hexagon with rounded corners. The term "regular hexagon" means a hexagon in which the lengths of the respective sides are equal and the interior angles are also a constant angle of 120 degrees. Further, in the present description, the term "substantially regular hexagon" refers to a hexagon that can be treated as a regular hexagon. The units 9 are formed so that each unit 9 has the same shape. Note that, in the present embodiment, the meaning of the phrase "same shape" includes not only an identical shape, but also includes a shape which is the same except in the respect that the shape of each unit 9 is made to match a shape matching the curved shape of the outer panel 3.

Each unit 9 may also be formed in the shape of a hexagon that is other than a regular hexagon. Examples of a hexagon other than a regular hexagon that can be mentioned include a hexagon in which the lengths of the respective sides are not uniform, and a hexagon in which the interior angles are not made uniform at 120 degrees. Examples of a hexagon in which the lengths of the respective sides are not uniform that can be mentioned include a hexagon in which the length of a front end side and the length of a rear end side are set to a predetermined first length, and which has four sides whose lengths are each set to a predetermined second length that is different from the first length.

The overhanging structure 6 has a structure in which a plurality of the units 9 having a hexagonal annular shape are disposed in a close-packed arrangement. In this case, the term "close-packed" means that a plurality of the units 9 that are adjacent to each other are arranged without a gap therebetween. Specifically, each unit 9 is partitioned off from the other units 9 by unit boundaries 14. As illustrated in FIG. 5A and FIG. 5B, a front end 13c (lower end) of a bottom portion 13 forms a boundary of the bottom portion 13 that includes the front end 13c, to thereby form the unit boundary 14. The unit boundary 14 is formed in a hexagonal shape in plan view. By having such a structure in which the units 9 are disposed in a close-packed hexagonal arrangement, the overhanging structure 6 can withstand loads in substantially the same manner from all directions including the height direction Z over the whole area in plan view.

In a case where the units 9 are disposed in a close-packed arrangement, it is preferable that a plurality of the units 9 are the same shape as in the present embodiment. Note that, the units 9 that have similar forms to each other or/and have differing shapes may be disposed in a close-packed arrangement. Note that, in the overhanging structure 6, the units 9 need not be disposed in a close-packed arrangement, and another portion may be formed between the units 9 and 9 that are adjacent. Further, a plurality of the units 9 may have similar shapes to each other. In such a case, in the units 9 that have similar shapes to each other, flanges 11 of the respective units 9 also have similar shapes to each other.

In the present embodiment, a plurality of the units 9 are formed symmetrically in the cross direction X as a whole. For example, in the present embodiment, three of the units 9 are arranged side by side in the front-to-rear direction at the center in the cross direction X. Note that, there is no restriction on the direction of the units 9.

In the present embodiment, in the direction toward the right side from the aforementioned three units 9 arranged at the central position in the cross direction X, four units 9 are arranged side by side in the longitudinal direction Y, further three units 9 are arranged side by side in the longitudinal direction Y, further two units 9 are arranged side by side in the longitudinal direction Y, and further two units 9 are arranged side by side in the longitudinal direction Y, in this order. Furthermore, similarly to the foregoing arrangement, in the direction toward the left side from the aforementioned three units 9 arranged at the central position in the cross direction X, four units 9 are arranged side by side in the longitudinal direction Y, further three units 9 are arranged side by side in the longitudinal direction Y, further two units 9 are arranged side by side in the longitudinal direction Y, and further two units 9 are arranged side by side in the longitudinal direction Y, in this order. Thus, the units 9 having substantially the same shape are arranged in plurality in the longitudinal direction Y (front-rear direction) and the cross direction X.

As illustrated clearly in FIG. 5A, FIG. 5B, and FIG. 6, each unit 9 has six sub-units 10 (10a to 10f). In the present embodiment, in each of the units 9, the front sub-unit 10a and the rear sub-unit 10d extend along the cross direction X. Further, in each of the units 9, the remaining four sub-units 10b, 10c, 10e, and 10f extend in a direction that inclines with respect to the longitudinal direction Y in plan view. The unit 9 that has an external shape that is a polygonal shape is formed by the plurality of sub-units 10 in this way.

Each of the sub-units 10 (10a to 10f) has a flange 11 that is arranged adjacent to the outer panel 3, an inclined wall 12 extending from the flange 11 so as to separate from the outer panel 3, and the bottom portion 13 that is continuous with the inclined wall 12 and is separated from the flange 11.

The flange 11 is adjacent to the outer panel 3, and in the sub-unit 10, the flange 11 is a portion that is arranged closest to the outer panel 3. The flange 11 is a strip-shaped portion. In a single unit 9, the flanges 11 of the six sub-units 10a to 10f form an annular flange 15 whose outline shape is hexagonal as a whole. Note that, the annular flange 15 as a whole may form a flange having a polygonal shape other than a hexagon, or as described later, may form a substantially circular flange, or may form a flange having a substantially oval shape. Further, inner ends 11a of the six flanges 11 are formed in a circular shape which is centered on the center of the annular unit 9 as a whole. Note that, the plurality of inner ends 11a as a whole may be formed in a polygonal shape or may be formed in an oval shape. Further, the plurality of inner ends 11a may be formed in an asymmetrical shape that does not have an axis of symmetry or a center of symmetry.

In the flange 11, a facing surface 11b that faces the outer panel 3 is substantially parallel to the outer panel 3. In this case, the phrase "substantially parallel" means that the undersurface 3a of the outer panel 3 and the facing surface 11b form an angle of zero degrees or an angle that is within a range of about several degrees in each of the cross direction X, the longitudinal direction Y, and the height direction Z. In each flange 11, the joint 20 is arranged on the facing surface 11b. That is, the facing surface 11b is provided as a portion on which the joint 20 can be arranged. In the flange 11, on the facing surface 11b that faces the outer panel 3, the width to which the joint 20 can be applied is preferably 2 mm or more from the viewpoint of ensuring that a sufficient amount of the joint 20 can be provided.

In the present embodiment, in each unit 9, the flanges 11 of at least some of the sub-units 10 are adhered to the respective joints 20 on the facing surface 11b, and are adhered to the outer panel 3 through the joint 20. The inclined wall 12 extends downward from the flange 11.

The inclined wall 12 is disposed between the flange 11 and the bottom portion 13, and connects the flange 11 and the bottom portion 13. The inclined wall 12 extends from the flange 11 so as to separate from the outer panel 3. The inclined wall 12 is provided over the entire area in the longitudinal direction of the sub-unit 10 in which the relevant inclined wall 12 is provided. The inclined wall 12 is formed, for example, in a tapered shape that advances toward the central axis side (the inner end 11a side) of the unit 9 as it approaches the outer panel 3 side.

The flange 11 is continuous with the upper end of the inclined wall 12. The bottom portion 13 is continuous with the lower end of the inclined wall 12. In the unit 9, the bottom portion 13 is a portion that is farthest from the outer panel 3, and is separated from the flange 11. The bottom portion 13 is provided over the entire area in the longitudinal direction of the sub-unit 10 in which the relevant inclined wall 12 is provided. The front end 13c of the bottom portion 13 in one unit 9 is integral with the front end 13c of the bottom portion 13 in another unit 9 that is adjacent thereto.

In the present embodiment, from the viewpoint of sufficiently securing the panel rigidity and the dent resistance of the outer panel 3, it is preferable that a distance L1 between the centers (central axes SI and SI) as viewed in the sheet thickness direction of two units 9 and 9 (joint-equipped units 9 and 9 in which the joint 20 is provided) which are adjacent to each other is 200 mm or less.

Next, the incomplete unit 8 that is clearly illustrated in FIG. 6 will be described more specifically. In the present embodiment, by having one or a plurality of sub-units 10, the incomplete unit 8 includes a portion that corresponds to one part of the unit 9. As mentioned above, the sub-unit 10 has the flange 11, the inclined wall 12, and the bottom portion 13. The flange 11 is a portion on which it is possible to arrange the joint 20.

In the present embodiment, a plurality of the incomplete units 8 are provided, that is, the overhanging structure 6 has incomplete units 81 and 82. In the present embodiment, the incomplete unit 81 is arranged near the left end of the rear end portion of the overhanging structure 6, and has four sub-units 10. The incomplete unit 82 is formed in a shape that is symmetrical in the cross direction X with respect to the incomplete unit 81.

Next, the joint 20 will be described more specifically while referring mainly to FIG. 2 and FIG. 6. The joint 20 is provided for joining the inner panel 2 and the outer panel 3. In the present embodiment, an adhesive is used as the joint 20. A mastic sealer (mastic adhesive) can be exemplified as the adhesive. A resin-based adhesive can be exemplified as the mastic sealer. In the present description, the terms "sealer" and "adhesive" are used with the same meaning. The adhesive may have a property of being cured at normal temperature (for example, 20 degrees Celsius), or may have a property of being cured by undergoing a heating process or a drying process. The adhesive that joins the inner panel 2 and the outer panel 3 is the joint 20.

The joints 20 are arranged so as to secure the joining strength between the inner panel 2 and the outer panel 3, the panel rigidity, and the dent resistance while achieving a reduction in the weight of the automobile hood 1. In the present embodiment, the joints 20 are provided on flanges 11 of each of the units 9 and the incomplete units 81 and 82 of the inner panel 2. The incomplete units 8 and the units 9 in which the joints 20 are provided are joint-equipped units. Although in the present embodiment the joints 20 are provided in all of the units 9 and the incomplete units 81 and 82, the joints 20 need not be provided in some of the units 9, and the joints 20 need not be provided in one or both of the incomplete units 81 and 82.

In the present embodiment, each joint 20 is arranged in a spot shape (circular shape). More specifically, in the present embodiment, the diameter of the joint 20 (diameter as viewed in the sheet thickness direction of the outer panel 3) is, for example, about 5 mm to 25 mm. The aspect ratio of the joint 20 (ratio of the maximum value to the minimum value of the diameter of the joint 20 as viewed in the sheet thickness direction) is for example, 1.0 to 2.0. In the present embodiment, the joints 20 have a uniform size. The joint 20 contacts both of the inner panel 2 and the outer panel 3. The joint 20 joins the facing surface 11b of the flange 11 and the undersurface 3a of the outer panel 3. By the flange 11 which is a part of the inner panel 2 which projects to the outer panel 3 side being joined to the outer panel 3 through the joint 20 in this way, the inner panel 2 can increase the panel rigidity and the dent resistance of the outer panel 3.

In the present embodiment, three joints 20 are provided on the annular flange 15 of each unit 9 and a plurality of flanges 11 of the incomplete units 81 and 82, respectively, as joint-equipped units in which the joints 20 are provided. Further, in each unit 9 and the incomplete units 81 and 82, the joints 20 are arranged in a first arrangement pattern P1 or a second arrangement pattern P2. In the present embodiment, each of the arrangement patterns P1 and P2 is a pattern in which the joints 20 are arranged at three of six vertex portions of the hexagonal unit 9, and in each unit 9 the joints 20 are arranged at an equal pitch of 120 degrees in the circumferential direction. In the first arrangement pattern P1, the joint 20 is arranged at each of a vertex portion between the sub-units 10a and 10b, a vertex portion between the sub-units 10c and 10d, and a vertex portion between the sub-units 10e and 10f. In the second arrangement pattern P2, the joint 20 is arranged at each of a vertex portion between the sub-units 10b and 10c, a vertex portion between the sub-units 10d and 10e, and a vertex portion between the sub-units 10f and 10a.

The first arrangement pattern P1 is arranged along an oblique direction C extending from the left rear to the right front. The first arrangement pattern P1 is set to the same size in each of the units 8 and 9 in which the first arrangement pattern P1 is provided. In other words, the first arrangement pattern P1 is set to the same size in each of the units 8 and 9 in which the joints 20 of the relevant first arrangement pattern P1 are arranged. In addition, in the present embodiment, the first arrangement pattern P1 is set to the same orientation as viewed in the sheet thickness direction in each of the units 8 and 9 in which the joints 20 of the relevant first arrangement pattern P1 are arranged. As viewed in the sheet thickness direction, the relative positions of (relative distances between) the three joints 20 in one first arrangement pattern P1 are common to the plurality of first arrangement patterns P1.

Similarly, the second arrangement pattern P2 is arranged along the oblique direction C. The second arrangement pattern P2 is set to the same size in each of the units 8 and 9 in which the second arrangement pattern P2 is provided. In other words, the second arrangement pattern P2 is set to the same size in each of the units 8 and 9 in which the joints 20 of the relevant second arrangement pattern P2 are arranged. In addition, in the present embodiment, the second arrangement pattern P2 is set to the same orientation as viewed in the sheet thickness direction in each of the units 8 and 9 in which the joints 20 of the relevant second arrangement pattern P2 are arranged. As viewed in the sheet thickness direction, the relative positions of (relative distances between) the three joints 20 in one second arrangement pattern P2 are common to the plurality of second arrangement patterns P2.

With regard to the joints 20 in one first arrangement pattern P1, the distance between the two joints 20 which are farthest from each other is preferably 200 mm or less from the viewpoint of sufficiently securing the panel rigidity and the dent resistance of the outer panel 3, more preferably is 150 mm or less, and further preferably is 110 mm or less. Similarly, with regard to the joints 20 in one second arrangement pattern P2, the distance between the two joints 20 which are farthest from each other is preferably 200 mm or less from the viewpoint of sufficiently securing the panel rigidity and the dent resistance of the outer panel 3, more preferably is 150 mm or less, and further preferably is 110 mm or less.

As viewed in the sheet thickness direction of the outer panel 3, the first arrangement pattern P1 and the second arrangement pattern P2 are arranged alternately in a direction (direction from the left front toward the right rear) that is perpendicular to the oblique direction C.

More specifically, in a first row B1 including four units 9 arranged along the oblique direction C on the left front side among the plurality of units 9, the joints 20 are arranged in the first arrangement pattern P1. Immediately after the first row B1, in a second row B2 including six units 9 arranged along the oblique direction C, the joints 20 are arranged in the second arrangement pattern P2. Immediately after the second row B2, in a third row B3 including five units 9 arranged along the oblique direction C, the joints 20 are arranged in the first arrangement pattern P1. The third row B3 also includes the incomplete unit 81. In the incomplete unit 81 in the third row B3, three joints 20 are arranged in the first arrangement pattern P1. Immediately after the third row B3, in a fourth row B4 including five units 9 arranged along the oblique direction C, the joints 20 are arranged in the second arrangement pattern P2. Immediately after the fourth row B4, in a fifth row B5 including four units 9 arranged along the oblique direction C, the joints 20 are arranged in the first arrangement pattern P1. Immediately after the fifth row B5, in a sixth row B6 including one unit 9 and the incomplete unit 82 arranged along the oblique direction C, the joints 20 are arranged in the second arrangement pattern P2.

According to the above configuration, in the present embodiment, first-direction joint rows 30 in each of which a plurality of the joints 20 are arranged at an interval from each other in an aligned relationship in the cross direction X, and second-direction joint rows 40 in each of which a plurality of the joints 20 are arranged at an interval from each other in an aligned relationship in the longitudinal direction Y that is perpendicular to the cross direction X are formed in the automobile hood 1.

In the present embodiment, the joints 20 of the first-direction joint rows 30 and the joints 20 of the second-direction joint rows 40 are arranged in all of the hexagonal units 9 and the incomplete units 81 and 82. Note that, units 9 or incomplete units 81 and 82 in which at least one of the first-direction joint row 30 and the second-direction joint row 40 is not provided may exist.

Further, in the present embodiment, the joints 20 are arranged in the first or second arrangement pattern P1 or P2 at all of the flanges (annular flange 15, and plurality of flanges 11) where the first-direction joint rows 30 and the second-direction joint rows 40 are arranged.

Further, in the present embodiment, at all of the flanges (annular flange 15, and plurality of flanges 11) where the first-direction joint rows 30 and the second-direction joint rows 40 are arranged, the joints 20 are arranged at an equal pitch in the circumferential direction of the flanges.

In the present embodiment, in a single unit 9, the joints 20 are arranged in an arrangement that includes one first arrangement pattern P1 or second arrangement pattern P2 (a predetermined pattern). By this means, a plurality of spot-shaped joints 20 are arranged in a single unit 9. In the present embodiment, 15 or more of the first and second arrangement patterns P1 and P2 are provided in total.

The cross direction X is one example of a "first direction" in the present invention, and the longitudinal direction Y is one example of a "second direction" in the present invention.

In the present embodiment, an end joint row 31 and a middle joint row 32 are defined as the first-direction joint rows 30.

In the present embodiment, the end joint row 31 and the middle joint row 32 appear repeatedly in this order from the front toward the rear of the inner panel 2.

In the present embodiment, the end joint row 31 includes the joints 20 arranged in the sub-unit 10a on the front side of the units 9, and the joints 20 arranged in the sub-unit 10d on the rear side of the units 9, and these joints 20 are aligned in the cross direction X.

In the present embodiment, the middle joint row 32 includes the joint 20 arranged at the boundary between the sub-units 10b and 10c, and the joint 20 arranged at the boundary between the sub-units 10e and 10f, and these joints 20 are aligned in the cross direction X. The joints 20 of the middle joint row 32 include the joint 20 that is at a middle portion in the longitudinal direction Y in each unit 9 and the incomplete units 81 and 82.

Note that, each of the end joint row 31 and the middle joint row 32 are not limited to only a configuration in which the joints 20 are arranged in a straight line in the cross direction X, and it suffices that at least some of the joints 20 are aligned in the cross direction X.

In the present embodiment, a left-side joint row 41, a first middle joint row 42, a second middle joint row 43, and a right-side joint row 44 are defined as the second-direction joint rows 40.

In the present embodiment, the left-side joint row 41, the first middle joint row 42, the second middle joint row 43, and the right-side joint row 44 appear repeatedly in this order from the left side toward the right side of the inner panel 2.

In the present embodiment, the left-side joint row 41 includes the joint 20 arranged at the boundary between the sub-units 10e and 10f, and these joints 20 are aligned in the longitudinal direction Y. The joints 20 of the left-side joint row 41 include the joint 20 at the left end of each of the units 9 and the incomplete units 81 and 82.

In the present embodiment, the first middle joint row 42 includes the joint 20 at the boundary between the sub-units 10a and 10f, and the joint 20 at the boundary between the sub-units 10d and 10e, and these joints 20 are aligned in the longitudinal direction Y. The joints 20 of the first middle joint row 42 include the joints 20 on the left side of the middle portion in the cross direction X in each unit 9 and the incomplete units 81 and 82.

In the present embodiment, the second middle joint row 43 includes the joint 20 arranged at the boundary between the sub-units 10a and 10b, and the joint 20 arranged at the boundary between the sub-units 10c and 10d, and these joints 20 are aligned in the longitudinal direction Y. The joints 20 of the second middle joint row 43 include the joints 20 on the right side of the middle portion in the cross direction X in each unit 9 and the incomplete units 81 and 82.

In the present embodiment, the right-side joint row 44 includes the joint 20 arranged at the boundary between the sub-units 10b and 10c, and these joints 20 are aligned in the longitudinal direction Y. The joints 20 of the right-side joint row 44 include the joint 20 at the right end of each of the units 9 and the incomplete units 81 and 82.

Note that, each of the left-side joint row 41, the middle joint rows 42 and 43, and the right-side joint row 44 are not limited to only a configuration in which the joints 20 are arranged in a straight line in the longitudinal direction Y, and it suffices that at least some of the joints 20 are aligned in the longitudinal direction Y.

An interval X1 (interval in the cross direction X) between a plurality of joints 20 in the first-direction joint rows 30 is set to an interval that is greater than an interval Y1 (interval in the longitudinal direction Y) between a plurality of joints 20 in the second-direction joint rows 40.

In the present embodiment, a minimum interval X11 between the joints 20 in the first-direction joint rows 30 is set to an interval that is greater than a minimum interval Y11 between the joints 20 in the second-direction joint rows 40 (X11>Y11).

Specifically, in the present embodiment, the minimum interval X11 between the joints 20 in the first-direction joint rows 30 is an interval between, in the end joint row 31, the joint 20 at the boundary between the sub-units 10c and 10d arranged in the first arrangement pattern P1 and, in the unit 9 immediately to the right of the aforementioned joint 20, the joint 20 at the boundary between the sub-units 10f and 10a arranged in the second arrangement pattern P2. Further, the minimum interval Y11 between the joints 20 in the second-direction joint rows 40 is, in the present embodiment, an interval between two joints 20 and 20 in the same second-direction joint row 40 in a single unit 9.

Further, in the present embodiment, a maximum interval X12 between the joints 20 in the first-direction joint rows 30 is set to an interval that is greater than a maximum interval Y12 between the joints 20 in the second-direction joint rows 40.

Specifically, in the present embodiment, the maximum interval X12 between the joints 20 in the first-direction joint rows 30 is, in the middle joint row 32, an interval between the joint 20 at the boundary between the sub-units 10e and 10f arranged in the first arrangement pattern P1 and, to the immediate right of the aforementioned joint 20 when proceeding straight along the cross direction X, the joint 20 between the sub-units 10b and 10c in the second arrangement pattern P2. Further, in the present embodiment, the maximum interval Y12 between the joints 20 in the second-direction joint rows 40 is an interval between two joints 20 and 20 in the left-side joint row 41, and is also an interval between two joints 20 and 20 in the right-side joint row 44.

In the present embodiment, oblique-direction joint rows 50 in which a plurality of joints 20 are arranged in an aligned relationship in a direction that obliquely intersects with the first-direction joint rows 30 are formed.

The oblique-direction joint rows 50 extend along the oblique direction C, and four types of the oblique-direction joint rows 50 are provided in the present embodiment. Specifically, a first oblique-direction joint row 51, a second oblique-direction joint row 52, a third oblique-direction joint row 53, and a fourth oblique-direction joint row 54 are provided as the oblique-direction joint rows 50. The first oblique-direction joint row 51, the second oblique-direction joint row 52, the third oblique-direction joint row 53, and the fourth oblique-direction joint row 54 are repeatedly arranged in this order from the left front side toward the right rear side. In each oblique-direction joint row 50, the joints 20 are arranged in an aligned relationship along the oblique direction C. In this case, the meaning of the phrase "the joints 20 are arranged in an aligned relationship along the oblique direction C" is not limited to a case where the joints 20 are arranged in an aligned relationship in a straight line along the oblique direction C. and includes a case where at least some of the joints 20 are arranged in an aligned relationship in the oblique direction C. An angle θ1 that the oblique direction C forms with respect to the cross direction X is, for example, approximately 30 degrees. The angle θ1 is not particularly limited.

The first oblique-direction joint row 51 includes the two joints 20 that are on the left front side among the three joints 20 in the first arrangement pattern P1. The second oblique-direction joint row 52 includes the one joint 20 that is on the right rear side among the three joints 20 in the first arrangement pattern P1. The third oblique-direction joint row 53 includes the one joint 20 that is on the left front side among the three joints 20 in the second arrangement pattern P2. The fourth oblique-direction joint row 54 includes the two joints 20 that are on the right rear side among the three joints 20 in the second arrangement pattern P2.

In the present embodiment, each joint 20 in the oblique-direction joint rows 50 is a joint 20 of the first-direction joint rows 30, and is a joint 20 of the second-direction joint rows 40. Note that, there may be a joint 20 which belongs to the oblique-direction joint rows 50, but does not belong to the first and second direction joint rows 30 and 40.

A curvature 1/R1 in a direction along the first-direction joint rows 30 in a region of the outer panel 3 corresponding to the first-direction joint rows 30 is set to a curvature that is less than a curvature 1/R2 in a direction along the second-direction joint rows 40 in a region of the outer panel 3 corresponding to the second-direction joint rows 40.

Referring to FIG. 1 and FIG. 6, specifically, the curvature 1/R1 along the cross direction X of the outer panel 3 above each first-direction joint row 30 is smaller than a curvature 1/R2 along the longitudinal direction Y of the outer panel 3 above each second-direction joint row 40 at a position above the relevant first-direction joint row 30 ((1/R1)<(1/R2)). In other words, a radius of curvature R1 in the cross direction X of the outer panel 3 above each first-direction joint row 30 is greater than a radius of curvature R2 in a direction along the longitudinal direction Y of each second-direction joint row 40 at a position above the relevant first-direction joint row 30 (R1>R2). The radius of curvature R1 is, for example, 2000 mm to 10000 mm, and the radius of curvature R2 is, for example, 400 mm to 4000 mm.

Note that, the curvatures R1 and R2 mentioned above each refer to the curvature (for example, the mean curvature) at places excluding a character line on the outer panel 3, and places where the curvatures R1 and R2 change discontinuously are excluded from the places used to calculate the curvatures R1 and R2.

Further, in the present embodiment, the length of the outer panel 3 in the cross direction X is longer than the length of the outer panel 3 in the longitudinal direction Y. That is, in the present embodiment, the outer panel 3 is a horizontally long panel. Therefore, the bending rigidity of the outer panel 3 in the cross direction X is lower than the bending rigidity of the outer panel 3 in the longitudinal direction Y. Note that, the length of the outer panel 3 in the cross direction X may be shorter than the length of the outer panel 3 in the longitudinal direction Y.

The foregoing is a description of the schematic configuration of the automobile hood 1.

Next, the main points of an example of a method for producing the automobile hood 1 will be described. In an application process for applying the joints 20, first, the inner panel 2 or the outer panel 3 as an application target is placed on an unshown workbench. Adhesive that will serve as the joints 20 is then applied to the application target by an applicator having one or a plurality of nozzles. After the adhesive is applied to the application target, the inner panel 2 and the outer panel 3 are fitted together using a robot arm (not illustrated) or the like. By this means, some of the adhesive contacts both the inner panel 2 and the outer panel 3 to form the joints 20, and the joints 20 join these panels 2 and 3 together. Thereafter, for example, the outer circumferential edge part of the outer panel 3 is subjected to hemming, and thereafter a painting process and a baking process or the like are performed to complete the automobile hood 1.

As described above, according to the present embodiment, the curvature 1/R1 in a direction along the first-direction joint rows 30 in a region of the outer panel 3 corresponding to the first-direction joint rows 30 is smaller than the curvature 1/R2 in a direction along the second-direction joint rows 40 in a region of the outer panel 3 corresponding to the second-direction joint rows 40. Further, the interval X1 between the joints 20 in the first-direction joint rows 30 is greater than the interval Y1 between the joints 20 in the second-direction joint rows 40. With this configuration, because the curvature is relatively small (the radius of curvature is large), the arrangement interval between the joints 20 which are a cause of thermal deformation is made wide (the joints 20 are arranged in a non-dense arrangement) at places where thermal deformation is liable to occur during production of the automobile hood 1 and the rigidity is low. By this means, the influence of thermal deformation of the joints 20 caused by the baking process when producing the automobile hood 1 can be reduced at places where the strain is liable to occur.

In addition, as mentioned above, in the outer panel 3, because the curvature is relatively small (the radius of curvature is large), the arrangement interval between the joints 20 which are a cause of thermal deformation is made wide above the first-direction joint rows 30 where the rigidity is low and thermal deformation is liable to occur. Since the outer panel 3 is not excessively constrained by the joints 20 at the places where the arrangement interval between the joints 20 is made wide, the outer panel 3 can elastically deform to an appropriate extent, and as a result the dent resistance of the outer panel 3 can be increased.

Further, according to the present embodiment, by joining the inner panel 2 and the outer panel 3 by providing the joints 20 on the annular flange 15 arranged so as to project toward the outer panel 3 side, the support rigidity with which the outer panel 3 is supported by the inner panel 2 can be increased. By the units 9 that have a polygonal shape, and in particular a honeycomb shape, being disposed in a close-packed arrangement, the support rigidity with which the outer panel 3 is supported by the inner panel 2 can be made extremely high. Hence, even in a case where the sheet thickness of the outer panel 3 is made small, the panel rigidity of the outer panel 3 can be sufficiently secured.

Further, according to the present embodiment, the joints 20 in the first-direction joint rows 30 and the joints 20 of the second-direction joint rows 40 are arranged in all of the polygonal units 9. According to this configuration, the outer panel 3 can be supported in a wide region by the inner panel 2 while securing sufficient joining places between the inner panel 2 and the outer panel 3. Hence, the panel rigidity and the dent resistance of the outer panel 3 can be made higher.

Further, according to the present embodiment, three joints 20 are provided in the units 9. Because there are three joints 20, the joints 20 can be arranged at appropriate intervals in the cross direction X and the longitudinal direction Y. Hence, it is easy to realize the aforementioned layout of the joints 20 that can reduce thermal deformation in the outer panel 3.

Further, according to the present embodiment, on each of the flanges (the annular flange 15 and the plurality of flanges 11) where the first-direction joint rows 30 and the second-direction joint rows 40 are arranged, the joints 20 are arranged in the first arrangement pattern P1 or the second arrangement pattern P2. By adopting this kind of patterned arrangement of the joints 20, the panel rigidity and the dent resistance in the outer panel 3 can be made more uniform.

Further, according to the present embodiment, 15 or more of the first and second arrangement patterns P1 and P2 are provided in one automobile hood 1.

According to this configuration, the joints 20 can be distributed over a wider range in the outer panel 3. By this means, sufficient panel rigidity and the dent resistance can be secured over the whole of the automobile hood 1.

Further, according to the present embodiment, a plurality of the joints 20 are arranged so as to form the oblique-direction joint rows 50 in which the joint 20 are arranged in an aligned relationship in a direction that intersects with the first-direction joint rows 30. By arranging the joints 20 in this way, the minimum interval X11 between the joints 20 in the first-direction joint rows 30 can be made larger than the minimum interval Y11 between the joints 20 in the second-direction joint rows 40. That is, by providing the oblique-direction joint rows 50, it is possible to easily realize an arrangement of the joints 20 in which the minimum intervals satisfy X11>Y11.

Further, according to the present embodiment, the curvature 1/R1 of the outer panel 3 relating to the first-direction joint rows 30 is less than the curvature 1/R2 of the outer panel 3 relating to the second-direction joint rows 40, and furthermore, the interval X1 between the joints 20 in the first-direction joint rows 30 is greater than the interval Y1 between the joints 20 in the second-direction joint rows 40. In addition, in the present embodiment, the automobile hood 1 has a length in the cross direction X that is longer than the length thereof in the longitudinal direction Y. In this configuration, the arrangement density of the joints 20 along the cross direction X of the automobile hood 1 which is elongated in the cross direction X can be made less than the arrangement density of the joints 20 along the cross direction X in a case where the first-direction joint rows 30 are arranged along the longitudinal direction Y. Therefore, the number of joints 20 in the automobile hood 1 as an automotive exterior component can be relatively reduced. As a result, the automobile hood 1 can be made lighter.

Further, each unit 9 has a honeycomb shape and a plurality of the units 9 are disposed in a close-packed arrangement, the sheet thickness of the inner panel 2 and the outer panel 3 is reduced, and the joints 20 are arranged in a preferable arrangement as described in the present embodiment. By this means, a panel rigidity and a dent resistance characteristic which are equivalent to a panel rigidity and a dent resistance characteristic obtained when using a steel sheet having a tensile strength of 340 MPa and a sheet thickness of 0.65 mm for the outer panel can be obtained by a duplex steel sheet (DP steel) having a tensile strength of 590 MPa and a sheet thickness of 0.40 mm, and in addition, thermal deformation in the outer panel 3 which is attributable to the sealer (joints 20) can be reduced.

An embodiment of the present invention is described above. However, the present invention is not limited to the above embodiment. In the present invention, various changes are possible within the scope of the accompanying claims. Note that, hereunder, configurations that are different from the above embodiment are mainly described, and like components are denoted by the like reference symbols as in the above embodiment and a detailed description thereof may be omitted.

<First Modification>

In the embodiment, three joints 20 are arranged in a triangular shape in a single unit 9. However, the joints 20 may be arranged in a different shape. FIG. 7 is a view illustrating a principal part of a first modification. Referring to FIG. 7, according to the first modification, four joints 20 are arranged in a quadrangular shape in a single unit 9.

In the present modification, four joints 20 are provided in each single unit 9. Further, the joints 20 are arranged in a single arrangement pattern in each unit 9. In the present modification, the arrangement pattern is a pattern in which, in a single unit 9, joints 20 are arranged so as to be aligned in a direction (the oblique direction C as a direction intersecting with the cross direction X) that intersects with first-direction joint rows 30A.

In the present modification, an angle θ1A that the oblique direction C forms with respect to the cross direction X (minor angle) is, for example, about 15 to 45 degrees. The joints 20 are arranged at an equal pitch of 90 degrees in the circumferential direction in each unit 9. According to this arrangement pattern, the joints 20 are arranged in each of the sub-units 10a, 10b, 10d, and 10e. The joints 20 are arranged in the aforementioned pattern at each of the flanges (the annular flange 15, and the plurality of flanges 11) where the first-direction joint rows 30A and second-direction joint rows 40A are arranged.

This arrangement pattern is set to the same size in each of the units 8 and 9 in which the relevant arrangement pattern is provided. In other words, the arrangement pattern with four joints 20 is set to the same size in all of the units 8 and 9 in which the relevant arrangement pattern with four joints 20 is arranged. In addition, in the present modification, the arrangement pattern with four joints 20 is set to the same orientation as viewed in the sheet thickness direction in all of the units 8 and 9 which have the relevant arrangement pattern with four joints 20. As viewed in the sheet thickness direction, the relative positions of (relative distances between) the four joints 20 in one arrangement pattern with a set of four joints 20 is common to a plurality of the aforementioned arrangement patterns.

In the present modification, the joints 20 are arranged in the arrangement of one arrangement pattern in a single unit 9. By this means, a plurality of spot-shaped joints 20 are arranged in a single unit 9. In the present modification, this arrangement pattern is provided at 15 or more places in total.

With regard to the joints 20 in a single unit 9, the distance between the two joints 20 which are farthest from each other is preferably 200 mm or less from the viewpoint of sufficiently securing the panel rigidity and the dent resistance of the outer panel 3, more preferably is 150 mm or less, and further preferably is 110 mm or less.

In the present modification, the joints 20 are arranged in the same arrangement pattern in all of the units 9 and the incomplete units 81 and 82. That is, in the present modification, four joints 20 are provided on the annular flange 15 of each unit 9 and on the plurality of flanges 11 of the incomplete units 81 and 82, respectively, as joint-equipped units in which the joints 20 are provided.

According to the above configuration, in the present modification the first-direction joint rows 30A in each of which a plurality of the joints 20 are arranged at an interval from each other in an aligned relationship in the cross direction X, and the second-direction joint rows 40A in each of which a plurality of the joints 20 are arranged at an interval from each other in an aligned relationship in the longitudinal direction Y that is perpendicular to the cross direction X are formed.

In the present modification, the joints 20 of the first-direction joint rows 30A and the joints 20 of the second-direction joint rows 40A are arranged in all of the hexagonal units 9 and the incomplete units 81 and 82. Note that, units 9 or incomplete units 81 and 82 in which at least one of the first-direction joint row 30A and the second-direction joint row 40A is not provided may exist.

In the present modification, an end joint row 31A and two middle joint rows 32A and 33A are defined as the first-direction joint rows 30A.

In the present modification, the end joint row 31A, the middle joint row 32A, and the middle joint row 33A appear repeatedly in this order from the front toward the rear of the inner panel 2.

In the present modification, the end joint row 31A includes the joints 20 arranged in the corresponding sub-units 10a or 10d, and these joints 20 are aligned in the cross direction X. The joints 20 of the end joint row 31A include the joint 20 at the front or rear of each of the units 9 and the incomplete units 81 and 82.

In the present modification, the middle joint row 32A includes the joints 20 arranged in the corresponding sub-units 10b, and these joints 20 are aligned in the cross direction X. In the present modification, the middle joint row 33A includes the joints 20 arranged in the corresponding sub-units 10e, and these joints 20 are aligned in the cross direction X. The joints 20 of the middle joint rows 32A and 33A include the joints 20 that are at a middle portion in the longitudinal direction Y of each of the units 9 and the incomplete units 81 and 82.

Note that, the end joint row 31A and the middle joint rows 32A and 33A are each not limited to only a configuration in which the joints 20 are arranged in a straight line in the cross direction X. and it suffices that at least some of the joints 20 are aligned in the cross direction X.

In the present modification, a left-side joint row 41A, a middle joint row 42A, and a right-side joint row 44A are defined as the second-direction joint rows 40A.

In the present modification, the left-side joint row 41A, the middle joint row 42A, and the right-side joint row 44A appear repeatedly in this order from the left side toward the right side of the inner panel 2.

In the present modification, the left-side joint row 41A includes the joints 20 arranged in the corresponding sub-units 10e, and these joints 20 are aligned in the longitudinal direction Y. The joints 20 of the left-side joint row 41A include the joint 20 that is on the left side of each of the units 9 and the incomplete units 81 and 82.

In the present modification, the middle joint row 42A includes the joints 20 arranged in the corresponding sub-units 10a and 10d, and these joints 20 are aligned in the longitudinal direction Y. The joints 20 of the middle joint row 42A include the joints 20 that are at a middle portion in the cross direction X in each of the units 9 and the incomplete units 81 and 82.

In the present modification, the right-side joint row 44A includes the joints 20 arranged in the corresponding sub-units 10b, and these joints 20 are aligned in the longitudinal direction Y. The joints 20 of the right-side joint row 44A include the joint 20 that is on the right side of each of the units 9 and the incomplete units 81 and 82.

Note that, each of the left-side joint row 41A, the middle joint row 42A, and the right-side joint row 44A are not limited to only a configuration in which the joints 20 are arranged in a straight line in the cross direction X, and it suffices that at least some of the joints 20 are aligned in the cross direction X.

An interval X1A between a plurality of joints 20 in the first-direction joint rows 30A is set to an interval that is greater than an interval Y1A between a plurality of joints 20 in the second-direction joint rows 40A.

In the present modification, a minimum interval X11A between the joints 20 in the first-direction joint rows 30A is set to an interval that is greater than a minimum interval Y11A between the joints 20 in the second-direction joint rows 40A.

Specifically, in the present modification, the minimum interval X11A between the joints 20 in the first-direction joint rows 30A is, in the end joint row 31A of the first-direction joint rows 30A, an interval between the joint 20 of the sub-unit 10d which is on the left side and the joint 20 of the sub-unit 10a which is on the right side. Further, in the present modification, the minimum interval Y11A between the joints 20 and 20 in the second-direction joint rows 40A is, in the left-side joint row 41A, an interval between the joint 20 of a single unit 9 and the joint 20 in the unit 9 adjacent in the longitudinal direction Y to the aforementioned single unit 9.

In the present modification, a maximum interval X12A between the joints 20 in the first-direction joint rows 30A is set to an interval that is greater than a maximum interval Y12A between the joints 20 in the second-direction joint rows 40A.

Specifically, in the present modification, the maximum interval X12A between the joints 20 in the first-direction joint rows 30A is an interval between two joints 20 and 20 in the middle joint row 32A, or is an interval between two joints 20 and 20 in the middle joint row 33A. Further, in the present modification, the maximum interval Y12A between the joints 20 in the second-direction joint rows 40A is an interval between the joints 20 and 20 of the adjacent units 9 and 9 in the right-side joint row 44A, or is an interval between the joints 20 and 20 of the adjacent units 9 and 9 in the left-side joint row 41A.

In the present modification, oblique-direction joint rows 50A in which a plurality of joints 20 are arranged in an aligned relationship in a direction intersecting with the first-direction joint rows 30A is formed.

The oblique-direction joint rows 50A extend along the oblique direction C. and two types of the oblique-direction joint rows 50A are provided in the present modification. Specifically, a first oblique-direction joint row 51A and a second oblique-direction joint row 52A are provided as the oblique-direction joint rows 50A. The first oblique-direction joint row 51 and the second oblique-direction joint row 52 are repeatedly arranged in this order from the right front side toward the left rear side. In each of the oblique-direction joint rows 50A, the joints 20 are arranged in an aligned relationship in the oblique direction C. That is, in each oblique-direction joint row 50A, the joints 20 are arranged along the oblique direction C. An angle 81A that the oblique direction C forms with respect to the cross direction X is, for example, approximately 30 degrees. Although not particularly limited, the angle θ1A is, for example, preferably 15 to 75 degrees.

The first oblique-direction joint row 51A includes the two joints 20 that are on the right front side among the four joints 20 in each of the units 9 or the incomplete units 81 and 82. The second oblique-direction joint row 52A includes the two joints 20 that are on the left rear side among the four joints 20 in each of the units 9 or the incomplete units 81 and 82.

Note that, the interval X1A between the joints 20 in each first-direction joint row 30A is largest when the angle θ1A is 22.5 degrees or 67.5 degrees. FIG. 8 is a schematic diagram for describing intervals between the joints 20 in the cross direction X. In FIG. 8, samples 1 to 5 are illustrated in which the joints 20 are arranged in a lattice shape. In the sample 1, the joints 20 are arranged parallel to the cross direction X. The samples 2 to 5 show states in which sample 1 has been rotated by 22.5 degrees, 45 degrees, 67.5 degrees, and 90 degrees in plan view, respectively. When a distance between the joints 20 and 20 in the cross direction X in the sample 1 is taken as "a", the distances between the joints 20 and 20 in the cross direction X in the samples 2 to 5 are √5a, √2a, √5a, and a, respectively. Hence, as mentioned above, the interval X1A between the joints 20 in the first-direction joint row 30A is largest when the angle θ1A is 22.5 degrees or 67.5 degrees.

In the present modification, each joint 20 in the oblique-direction joint rows 50A is the joint 20 of the first-direction joint rows 30A, and is the joint 20 of the second-direction joint rows 40A. Note that, there may be the joint 20 which belongs to the oblique-direction joint rows 50A, but does not belong to the first and second direction joint rows 30A and 40A.

According to this first modification, four joints 20 are provided in the units 9 and the incomplete units 81 and 82. Because there are four joints 20, the joints 20 can be arranged at appropriate intervals in the cross direction X and the longitudinal direction Y. Hence, it is easy to realize the aforementioned layout of the joints 20 that can reduce thermal deformation in the outer panel 3.

<Second Modification>

FIG. 9 is a view illustrating a principal part of a second modification. Referring to FIG. 9, in the second modification, six joints 20 are arranged in a hexagonal shape in a single unit 9.

In the present modification, six joints 20 are provided in each single unit 9. Further, the joints 20 are arranged in a single arrangement pattern in each unit 9. In the present modification, the arrangement pattern is a pattern in which, in a single unit 9, six joints 20 are arranged at an equal pitch in the circumferential direction of the relevant unit 9. The joints 20 are arranged at a pitch of 60 degrees in the circumferential direction in each unit 9. According to this arrangement pattern, the joints 20 are arranged at each vertex portion of the hexagonal unit 9. The joints 20 are arranged in the aforementioned pattern at each of the flanges (the annular flange 15, and the plurality of flanges 11) where a first-direction joint row 30B and a second-direction joint row 40B are arranged.

This arrangement pattern is set to the same size in each of the units 8 and 9 in which the relevant arrangement pattern is provided. In other words, the arrangement pattern with six joints 20 is set to the same size in all of the units 8 and 9 in which the relevant arrangement pattern with six joints 20 is arranged. In addition, in the present modification, the arrangement pattern with six joints 20 is set to the same orientation as viewed in the sheet thickness direction in all of the units 8 and 9 which have the relevant arrangement pattern with six joints 20. As viewed in the sheet thickness direction, the relative positions of (relative distances between) the six joints 20 in one arrangement pattern with a set of six joints 20 is common to a plurality of the aforementioned arrangement patterns.

In the present modification, the joints 20 are arranged in the arrangement of one arrangement pattern in a single unit 9. By this means, a plurality of spot-shaped joints 20 are arranged in a single unit 9. In the present modification, this arrangement pattern is provided at 15 or more places in total.

With regard to the joints 20 in a single unit 9, the distance between the two joints 20 which are farthest from each other is preferably 200 mm or less from the viewpoint of sufficiently securing the panel rigidity and the dent resistance of the outer panel 3, more preferably is 150 mm or less, and further preferably is 110 mm or less.

In the present modification, the joints 20 are arranged in an identical arrangement pattern in all of the units 9 and the incomplete units 81 and 82. That is, in the present modification, six joints 20 are provided on the annular flange 15 of each unit 9 and on the plurality of flanges 11 of the incomplete units 81 and 82, respectively, as joint-equipped units in which the joints 20 are provided.

According to the above configuration, in the present modification the first-direction joint rows 30B in each of which a plurality of the joints 20 are arranged at an interval from each other in an aligned relationship in the cross direction X, and the second-direction joint rows 40B in each of which a plurality of the joints 20 are arranged at an interval from each other in an aligned relationship in the longitudinal direction Y that is perpendicular to the cross direction X are formed.

In the present modification, the joints 20 of the first-direction joint rows 30B and the joints 20 of the second-direction joint rows 40B are arranged in all of the hexagonal units 9 and the incomplete units 81 and 82. Note that, units 9 or incomplete units 81 and 82 in which at least one of the first-direction joint row 30B and the second-direction joint row 40B is not provided may exist.

In the present modification, an end joint row 31B and a middle joint row 32B are defined as the first-direction joint rows 30B.

In the present modification, the end joint row 31B and the middle joint row 32B appear repeatedly in this order from the front toward the rear of the inner panel 2.

In the present modification, the end joint row 31B includes two joints 20 that are arranged at the boundary between the sub-units 10a and 10b and at the boundary between the sub-units 10a and 10f, or two joints 20 that are arranged at the boundary between the sub-units 10c and 10d and at the boundary between the sub-units 10d and 10e, and these joints 20 are aligned in the cross direction X. The joints 20 of the end joint row 31B include the joints 20 at the front side or rear side of each of the units 9 and the incomplete units 81 and 82.

In the present modification, the middle joint row 32B includes the joints 20 arranged at the boundary between the sub-units 10b and 10c and at the boundary between the sub-units 10e and 10f, and these joints 20 are aligned in the cross direction X. The joints 20 of the middle joint row 32B include the joints 20 that are at a middle portion in the longitudinal direction Y in each of the units 9 and the incomplete units 81 and 82.

Note that, the end joint row 31B and the middle joint row 32B are each not limited to only a configuration in which the joints 20 are arranged in a straight line in the cross direction X, and it suffices that at least some of the joints 20 are aligned in the cross direction X.

In the present embodiment, a left-side joint row 41B and a right-side joint row 44B are defined as the second-direction joint rows 40B.

In the present modification, the left-side joint row 41B and the right-side joint row 44B appear repeatedly in this order from the left side toward the right side of the inner panel 2.

In the present modification, the left-side joint row 41B includes three joints 20 that are on the left side of each of the corresponding units 9, and these joints 20 are aligned in the longitudinal direction Y. In the present modification, the right-side joint row 44B includes three joints 20 that are on the right side of each of the corresponding units 9, and these joints 20 are aligned in the longitudinal direction Y.

Note that, each of the left-side joint row 41A and the right-side joint row 44A are not limited to only a configuration in which the joints 20 are arranged in a straight line in the longitudinal direction Y, and it suffices that at least some of the joints 20 are aligned in the longitudinal direction Y.

An interval X1B between the joints 20 in the first-direction joint rows 30B is set to an interval that is greater than an interval Y1B between the joints 20 in the second-direction joint rows 40B.

In the present modification, a minimum interval X11B between the joints 20 in the first-direction joint rows 30B is set to an interval that is greater than a minimum interval Y11B between the joints 20 in the second-direction joint rows 40B.

Specifically, in the present modification, the minimum interval X11B between the joints 20 in the first-direction joint rows 30B is, in the end joint row 31B of the first-direction joint rows 30B, an interval between two joints 20 and 20 that are aligned in the cross direction X in a single unit 9. Further, in the present modification, the minimum interval Y11B between the joints 20 in the second-direction joint rows 40B is, in the left-side joint row 41B or the right-side joint row 44B, an interval between two joints 20 and 20 that are adjacent in the longitudinal direction Y in a single unit 9.

In the present modification, a maximum interval X12B between the joints 20 in the first-direction joint rows 30B is set to an interval that is greater than a maximum interval Y12B between the joints 20 in the second-direction joint rows 40B.

Specifically, in the present modification, the maximum interval X12B between the joints 20 in the first-direction joint rows 30B is an interval between the joints 20 and 20 of two units 9 and 9 that are adjacent in the cross direction X in the middle joint row 32B. Further, in the present modification, the maximum interval Y12B between the adjacent joints 20 in the second-direction joint rows 40B is an interval between the joints 20 and 20 of the adjacent units 9 and 9 in the right-side joint row 44B or the left-side joint row 41B.

In the present modification, oblique-direction joint rows 50B in which a plurality of the joints 20 are arranged in an aligned relationship in a direction intersecting with the first-direction joint rows 30B are formed.

The oblique-direction joint rows 50B extend along the oblique direction C. In the present modification, a first oblique-direction joint row 51B and a second oblique-direction joint row 52B are provided as the oblique-direction joint rows 50B. The first oblique-direction joint row 51B and the second oblique-direction joint row 52B are alternately arranged from the right front toward the left rear as viewed in the sheet thickness direction of the outer panel 3.

The first oblique-direction joint row 51B includes three joints 20 that are on the right front side in each of the units 9 or the incomplete units 81 and 82. The second oblique-direction joint row 52B includes three joints 20 that are on the left rear side in each of the units 9 or the incomplete units 81 and 82. In each oblique-direction joint row 50B, the joints 20 are arranged along the oblique direction C. An angle θ1B that the oblique direction C forms with respect to the cross direction X is, for example, approximately 30 degrees. Although not particularly limited, the angle θ1B is preferably approximately 15 to 75 degrees.

In the present modification, each joint 20 in the oblique-direction joint rows 50B is the joint 20 of the first-direction joint rows 30B, and is the joint 20 of the second-direction joint rows 40B. Note that, there may be a joint 20 which belongs to the oblique-direction joint rows 50B, but does not belong to the first and second direction joint rows 30B and 40B.

According to the present second modification of the first embodiment, six joints 20 are provided in the units 9 and the incomplete units 81 and 82. Because there are six joints 20, the joints 20 can be arranged at appropriate intervals in the cross direction X and the longitudinal direction Y. Hence, it is easy to realize the aforementioned layout of the joints 20 that can reduce thermal deformation in the outer panel 3.

<Third Modification>

In the embodiment and modifications described above, the external shape of the flanges 11 and inclined walls 12 of each unit 9 is a polygonal shape (hexagonal shape) as a whole. However, a different external shape may be adopted.

FIG. 10A is a schematic plan view illustrating a principal part of a third modification. FIG. 10B is a plan view illustrating a principal part of FIG. 10A. FIG. 10C is a cross-sectional view along a line XC-XC in FIG. 10B.

Referring to FIG. 10A to FIG. 10C, in the third modification, the external shape of an annular flange 15C and an inclined wall 12C of each unit 9C is a circular shape (round) as a whole. In this modification, the cylindrical inclined wall 12C and the annular flange 15C which is ring-shaped are provided in each unit 9C. The arrangement of the joints 20 on the annular flange 15C in each unit 9C may be the same as the arrangement described in the embodiment (arrangement of three joints 20 in the first or second arrangement pattern Pt or P2 as illustrated in FIG. 10B), may be the same as the arrangement described in the first modification (arrangement of four joints 20 in each unit 9C as illustrated in FIG. 11A), or may be the same as the arrangement described in the second modification (arrangement of six joints 20 in each unit 9C as illustrated in FIG. 11B). Note that, the inclined wall 12C and the annular flange 15C may have, in plan view, an annular shape in which the radius of curvature is not constant, such as an oval annular shape. Although in the example illustrated in FIG. 11A an inclination angle θ1C is shown as being 30 degrees, the inclination angle θ1C is preferably within the range of about 15 to 75 degrees, and an angle of 22.5 is preferable.

In the present modification, from the viewpoint of sufficiently securing the panel rigidity and the dent resistance of the outer panel 3, it is preferable that a distance L1 between the centers (central axes SI and SI) as viewed in the sheet thickness direction of two units 9C and 9C (joint-equipped units 9C and 9C in which the joints 20 are provided) which are adjacent to each other is 200 mm or less.

<Fourth Modification>

In the embodiment and modifications described above, the external shape of the flanges 11 and 11C and the inclined walls 12 and 12C of each of the units 9 and 9C is a polygonal shape (hexagonal shape) or circular as a whole. However, a different external shape may be adopted.

FIG. 12A is a schematic plan view illustrating a principal part of a fourth modification. FIG. 12B is a plan view illustrating a principal part of FIG. 12A. FIG. 12C is a cross-sectional view along a line XIIC-XIIC in FIG. 12B.

Referring to FIG. 12A to FIG. 12C, in the fourth modification, each unit 9D is disposed in a close-packed arrangement (arranged without a gap therebetween) in a square shape as viewed in the sheet thickness direction of the outer panel 3. The units 9D are arranged in plurality in an aligned relationship in the cross direction X, and are arranged in plurality in an aligned relationship in the longitudinal direction Y, and are thereby arranged in a matrix.

The external shape of an annular flange 15D and an inclined wall 12D of each unit 9D is a square shape (rectangle) as a whole. The annular flange 15D that has a square shape is provided in each unit 9D. The arrangement of the joints 20 on the annular flange 15D in each unit 9D may be the same as the arrangement described in the embodiment (arrangement of three joints 20 in the first or second arrangement pattern P1 or P2), may be the same as the arrangement described in the first modification (arrangement of four joints 20 in each unit 9D as illustrated in FIG. 12C), or may be the same as the arrangement described in the third modification (arrangement of six joints 20 in each unit 9D).

In the present modification, from the viewpoint of sufficiently securing the panel rigidity and the dent resistance of the outer panel 3, it is preferable that a distance L1 between the centers (central axes SI and SI) as viewed in the sheet thickness direction of two units 9D and 9D (joint-equipped units 9D and 9D in which the joints 20 are provided) which are adjacent to each other is 200 mm or less.

In the present modification, an inclination angle θ1D of the oblique direction C with respect to the cross direction X is preferably within the range of 15 to 75 degrees, and a case where the inclination angle θ1D is 22.5 is illustrated in the drawings. Note that, in each unit 9D, the joints 20 may be arranged at an equal pitch in the circumferential direction of the respective units 9D. Further, the annular flange 15D may have a rectangular annular shape that is vertically long or horizontally long in plan view.

Note that, although in the present modification a form in which a unit boundary 14D is rectangular as viewed in the sheet thickness direction is described as an example, this need not be the case. For example, similarly to the embodiment, rectangular units 9D may be arranged on the inner side of each of a plurality of hexagonal unit boundaries 14.

<Other Modifications>

(1) In each embodiment and modification described above, a form in which the first-direction joint rows 30, 30A, and 30B are arranged along the cross direction X, and the second-direction joint rows 40, 40A, and 40B are arranged along the longitudinal direction Y is described as an example. However, a different form may be adopted. It suffices that the first-direction joint rows 30, 30A, and 30B and the corresponding second-direction joint rows 40, 40A, and 40B are joint rows which are perpendicular to each other in plan view, and a direction in which the first-direction joint rows 30, 30A, and 30B extend need not be parallel to the cross direction X. For example, the first-direction joint rows 30, 30A, and 30B may be joint rows that extend along the longitudinal direction Y (first direction), and the second-direction joint rows 40, 40A, and 40B may be joint rows that extend along the cross direction X (second direction). In this case, a curvature 1/R1 in a direction (longitudinal direction Y) along the first-direction joint rows 30, 30A, and 30B in a region of the outer panel 3 corresponding to the first-direction joint rows 30, 30A, and 30B is smaller than a curvature 1/R2 in a direction (cross direction X) along the second-direction joint rows 40, 40A, and 40B in a region of the outer panel 3 corresponding to the second-direction joint rows 40, 40A, and 40B.

(2) Further, in each embodiment and modification described above, a form in which the joints 20 are provided in all of the plurality of units 9, 9C, and 9D was mainly described. However, a different form may be adopted. In some of the embodiment and modifications each, a configuration may be adopted in which the joints 20 are not provided in some units in one inner panel 2.

(3) Further, in each embodiment and modification described above, a form in which the inner is the inner panel 2 was described as an example. However, a different form may be adopted. A stiffening member formed of a steel sheet, an aluminum sheet, or synthetic resin may be used as the inner. Note that, in a case where the automotive exterior component is a back door, examples of the inner that can be mentioned include a back door inner panel and a stiffening member. Further, in a case w % here the automotive exterior component is a roof panel, examples of the inner that can be mentioned include a roof reinforcement and a stiffening member.

(4) Further, in each embodiment and modification described above, a form in which the joints 20 belong to at least one of the first-direction joint rows 30, 30A, and 30B, the second-direction joint rows 40, 40A, and 40B, and the oblique-direction joint rows 50, 50A, and 50B was described as an example. However, a different form may be adopted. For example, the joints 20 that do not belong to any of the first-direction joint rows 30, 30A, and 30B, the second-direction joint rows 40, 40A, and 40B, and the oblique-direction joint rows 50, 50A, and 50B may be provided. According to this modification, for example, an additional joint 20 may be provided in each of the units 9 and 9 (9C and 9C; or 9D and 9D) that are the outermost units in the cross direction X, or an additional joint 20 may be provided in a unit 9 that is at the center in the cross direction X and is at the front end and/or rear end or the like, or an additional joint 20 may be provided at a similar flange portion to the flanges 11, 11C, 11D of the units 9, 9C, and 9D in the inner panel 2. By additionally providing joints 20 in this way, the balance of the joining strength between the inner panel 2 and the outer panel 3 can be further enhanced. As a result, the panel rigidity and the dent resistance of the outer panel 3 can be further increased.

EXAMPLES

An automobile hood according to the embodiment, an automobile hood according to the first modification, and an automobile hood according to the second modification were prepared as Examples 1 to 3. In the automobile hood of Example 1 (embodiment), three joints were arranged in each unit. In the automobile hood of Example 2 (first modification), four joints were arranged in each unit. In the automobile hood of Example 3 (second modification), six joints were arranged in each unit. Further, a Comparative Example was prepared. The Comparative Example had a configuration in which, in each unit in the automobile hood according to embodiment, the joints were arranged over the entire area in the circumferential direction of the unit.

Each of the Examples and the Comparative Example was obtained by performing a bake-hardening treatment at 170° C. for 20 minutes in an oven in a state in which the inner panel and the outer panel were joined together by the joints. The surface of the outer panel of each of the Examples and the Comparative Example was measured using a three-dimensional shape measurement device with the trade name "COMET" manufactured by ZEISS. Further, by numerically analyzing the measurement data, the curvature distribution at each position on the outer panel was quantified. Next, the curvature change at each position on the outer panel was evaluated, and locations where a maximum-minimum curvature difference $\Delta\rho^{-1}$ was $2.0 \times 10^{-4}$ mm$^{-1}$ or more were counted.

The number of locations counted in each of the Examples and the Comparative Example were as follows.

Example 1 (joints applied at three places): 2 locations
    Example 2 (joints applied at four places): 1 location
    Example 3 (joints applied at six places): 2 locations
    Comparative Example (joints applied over entire circumference): 10 locations Thus, it was demonstrated that the number of places where there is a large amount of thermal deformation in the outer panel can be remarkably reduced by devising an appropriate arrangement of the joints.

INDUSTRIAL APPLICABILITY

The present invention can be widely applied as an automotive exterior component.

REFERENCE SIGNS LIST

1 Automobile hood (automotive exterior component)
2 Inner panel (Inner)
3 Outer panel
9, 9C, 9D Unit
15, 15C, 15D Annular flange
12, 12C, 12D Inclined wall
13 Bottom portion
20 Joint
30, 30A, 30B First-direction joint row
40, 40A, 40B Second-direction joint row
50, 50A, 50B Oblique-direction joint row
1/R1 Curvature in direction along first-direction joint row in region of outer panel corresponding to first-direction joint row
1/R2 Curvature in direction along second-direction joint row in region of outer panel corresponding to second-direction joint row
L1 Distance between centers as viewed in sheet thickness direction of joint-equipped units
X Cross direction (first direction, second direction)
X1, X1A, X1B Interval between joints in first-direction joint row
Y Longitudinal direction (second direction, first direction)
Y1, Y1A, Y1B Interval between joints in second-direction joint row

The invention claimed is:

1. An automotive exterior component, comprising:
an outer panel,
an inner that is arranged along the outer panel on an inner side of a vehicle body relative to the outer panel, and
a plurality of joints having a spot shape that join the outer panel and the inner,
the plurality of joints arranged forming a first direction joint row in a first direction and a second direction joint row in a second direction, the second direction perpendicular to the first direction, each of the first direction joint row and the second direction joint row including at least three joints of the plurality of joints,
joints of the plurality of joints forming the first direction joint row being arranged at an interval from each other in an aligned relationship in the first direction, and
joints of the plurality of joints forming the second direction joint row being arranged at an interval from each other in an aligned relationship in the second direction-, wherein:

a curvature in a direction along the first-direction joint row in a region of the outer panel corresponding to the first-direction joint row is smaller than a curvature in a direction along the second-direction joint row in a region of the outer panel corresponding to the second-direction joint row; and the interval between the plurality of joints in the first-direction joint row is greater than the interval between the joints in the second-direction joint row.

2. The automotive exterior component according to claim 1, wherein:

the inner includes a plurality of units;

the units each include an annular flange which is arranged adjacent to the outer panel, an inclined wall that extends from the flange so as to separate from the outer panel, and a bottom portion that is continuous with the inclined wall and is separated from the flange; and the joint is arranged at the flange in the unit.

3. The automotive exterior component according to claim 2, wherein:

the units each are formed in a polygonal shape or a circular shape as viewed from a sheet thickness direction of the outer panel, and the automotive exterior component includes a configuration in which the plurality of units are disposed in a close-packed arrangement.

4. The automotive exterior component according to claim 3, wherein:

the polygonal shape is a hexagonal shape.

5. The automotive exterior component according to claim 3, wherein:

the joints of the first-direction joint row and the joints of the second-direction joint row are arranged in one of the plurality of polygonal or circular units.

6. The automotive exterior component according to claim 2, wherein:

three, four, or six of the joints are arranged at the flange in the unit.

7. The automotive exterior component according to claim 6, wherein:

the joints are arranged in a predetermined pattern at each of the flanges where the first-direction joint row and the second-direction joint row are arranged.

8. The automotive exterior component according to claim 2, wherein:

at the flange where the first-direction joint row and the second-direction joint row are arranged, the joints are arranged at an equal pitch in a circumferential direction of the flange.

9. The automotive exterior component according to claim 2, wherein:

a joint-equipped unit as the unit in which the joint is provided, is provided in plurality, the joint-equipped units have centers, respectively, and a distance between the centers as viewed in the sheet thickness direction of two of the joint-equipped units that are adjacent to each other is 200 mm or less.

10. The automotive exterior component according to claim 9, wherein:

15 or more of the joint-equipped units in which the joints are arranged in a predetermined pattern are arranged.

11. The automotive exterior component according to claim 1, further having:

an oblique-direction joint row in which the plurality of joints are arranged in an aligned relationship in a direction that obliquely intersects with the first-direction joint row.

12. The automotive exterior component according to claim 11, wherein:

each of the joints in the oblique-direction joint row is one of the joints of the first-direction joint row and is one of the joints of the second-direction joint row.

13. The automotive exterior component according to claim 1, wherein:

the outer panel is a hood outer panel.

14. The automotive exterior component according to claim 13, wherein:

the first direction is a vehicle body cross direction.

15. The automotive exterior component according to claim 1, wherein:

the outer panel is a steel sheet having a sheet thickness of 0.60 mm or less, and the inner is a steel sheet having a sheet thickness of 0.50 mm or less.

16. The automotive exterior component according to claim 1, wherein:

the outer panel is an aluminum sheet having a sheet thickness of 0.75 mm or less, and the inner is an aluminum sheet having a sheet thickness of 0.75 mm or less.

* * * * *